United States Patent
Choi et al.

(10) Patent No.: US 11,765,470 B2
(45) Date of Patent: Sep. 19, 2023

(54) PIXEL ARRAY INCLUDING EVENLY ARRANGED PHASE DETECTION PIXELS AND IMAGE SENSOR INCLUDING THE PIXEL ARRAY

(71) Applicant: SAMSUNG ELECTRONICS CO., LTD., Suwon-si (KR)

(72) Inventors: Wooseok Choi, Suwon-si (KR); Dongjin Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 41 days.

(21) Appl. No.: 17/505,723

(22) Filed: Oct. 20, 2021

(65) Prior Publication Data

US 2022/0132079 A1 Apr. 28, 2022

(30) Foreign Application Priority Data

Oct. 26, 2020 (KR) .................. 10-2020-0139762
Mar. 9, 2021 (KR) .................. 10-2021-0030933

(51) Int. Cl.
*H04N 23/84* (2023.01)
*H04N 25/50* (2023.01)
*H04N 25/75* (2023.01)

(52) U.S. Cl.
CPC ............ *H04N 23/84* (2023.01); *H04N 25/50* (2023.01); *H04N 25/75* (2023.01); *H04N 2209/042* (2013.01)

(58) Field of Classification Search
CPC ........ H04N 23/84; H04N 25/50; H04N 25/75; H04N 2209/042; H04N 23/843; H04N 25/13; H04N 25/135; H04N 25/704; H04N 25/70; H01L 27/14605; H01L 27/14621; H01L 27/14627; H01L 27/14634; H01L 27/14685; H01L 27/1469
See application file for complete search history.

(56) References Cited

U.S. PATENT DOCUMENTS

| | | |
|---|---|---|
| 8,068,153 B2 | 11/2011 | Kumar et al. |
| 9,118,904 B2 | 8/2015 | Kobayashi et al. |
| 9,521,338 B2 | 12/2016 | Vogelsang et al. |
| 9,729,806 B2 | 8/2017 | Fettig et al. |
| 9,749,556 B2 | 8/2017 | Fettig et al. |
| 9,804,357 B2 | 10/2017 | Galor Gluskin et al. |
| 2010/0176273 A1* | 7/2010 | Shimoda ............... H04N 23/672 250/216 |
| 2015/0229847 A1* | 8/2015 | Aoki ..................... H04N 23/843 348/333.05 |
| 2016/0286108 A1* | 9/2016 | Fettig .................... H04N 25/46 |
| 2021/0126033 A1* | 4/2021 | Yang ..................... H04N 25/133 |

* cited by examiner

*Primary Examiner* — Nhan T Tran
(74) *Attorney, Agent, or Firm* — F. Chau & Associates, LLC

(57) ABSTRACT

A pixel array includes a plurality of pixel groups. Each of the plurality of pixel groups includes a plurality of subpixels arranged in an M×N matrix, where M is a natural number equal to or greater than 2, and N is a natural number equal to or greater than 2, as well as a plurality of color pixels configured to sense pieces of light having different wavelength bands. Each of the plurality of color pixels includes a same number of phase detection pixels.

15 Claims, 23 Drawing Sheets

PIXEL ARRAY INCLUDING EVENLY ARRANGED PHASE DETECTION PIXELS AND IMAGE SENSOR INCLUDING THE PIXEL ARRAY

CROSS-REFERENCE TO RELATED APPLICATIONS

This application is based on and claims priority under 35 U.S.C. § 119 to Korean Patent Application Nos. 10-2020-0139762 filed on Oct. 26, 2020, and 10-2021-0030933 filed on Mar. 9, 2021, in the Korean Intellectual Property Office, the disclosures of which are incorporated by reference herein in their entirety.

TECHNICAL FIELD

Embodiments of the inventive concept relate to a pixel array, and more particularly, to a pixel array including a plurality of phase detection pixels arranged evenly in each color pixel, and an image sensor including the pixel array.

DISCUSSION OF RELATED ART

Image sensors may include a pixel array which senses an optical signal received therein. As image sensors provide an auto focusing function, the pixel array may include a plurality of phase detection pixels, and the phase detection pixels may be discontinuously and irregularly arranged in the pixel array.

SUMMARY

Embodiments of the inventive concept provide a pixel array and an image sensor including the same, in which a plurality of phase detection pixels are evenly arranged, and thus, color channel-based noise of each pixel may be reduced or minimized.

According to an embodiment of the inventive concept, a pixel array includes a plurality of pixel groups. Each of the plurality of pixel groups includes a plurality of subpixels arranged in an M×N matrix, where M is a natural number equal to or greater than 2, and N is a natural number equal to or greater than 2, as well as a plurality of color pixels configured to sense pieces of light having different wavelength bands. Each of the plurality of color pixels includes a same number of phase detection pixels.

According to an embodiment of the inventive concept, an image sensor includes a pixel array including a plurality of subpixels and a plurality of color pixels configured to sense pieces of light having different wavelength bands. Each of the plurality of color pixels includes a same number of phase detection pixels. The image sensor further includes a readout circuit configured to convert a sensing signal, received from the pixel array through a plurality of column lines, into binary data. The image sensor further includes a row decoder configured to generate a row selection signal controlling the pixel array such that the sensing signal is output through a plurality of row lines for each row, and a control logic configured to control the row decoder and the readout circuit.

According to an embodiment of the inventive concept, an image sensor includes a pixel array including a plurality of subpixels and a plurality of color pixels configured to sense pieces of light having different wavelength bands. Each of the plurality of color pixels includes a phase detection pixel disposed at a certain position. The image sensor further includes a readout circuit configured to convert a sensing signal, received from the pixel array through a plurality of column lines, into binary data. The image sensor further includes a row decoder configured to generate a row selection signal controlling the pixel array such that the sensing signal is output through a plurality of row lines for each row, and a control logic configured to control the row decoder and the readout circuit and to change a method of outputting the sensing signal based on a mode signal.

BRIEF DESCRIPTION OF THE DRAWINGS

The above and other features of the inventive concept will become more apparent by describing in detail embodiments thereof with reference to the accompanying drawings, in which:

FIGS. 8A to 8F are diagrams illustrating various embodiments of evenly arranged phase detection pixels;

and

Figure 16:
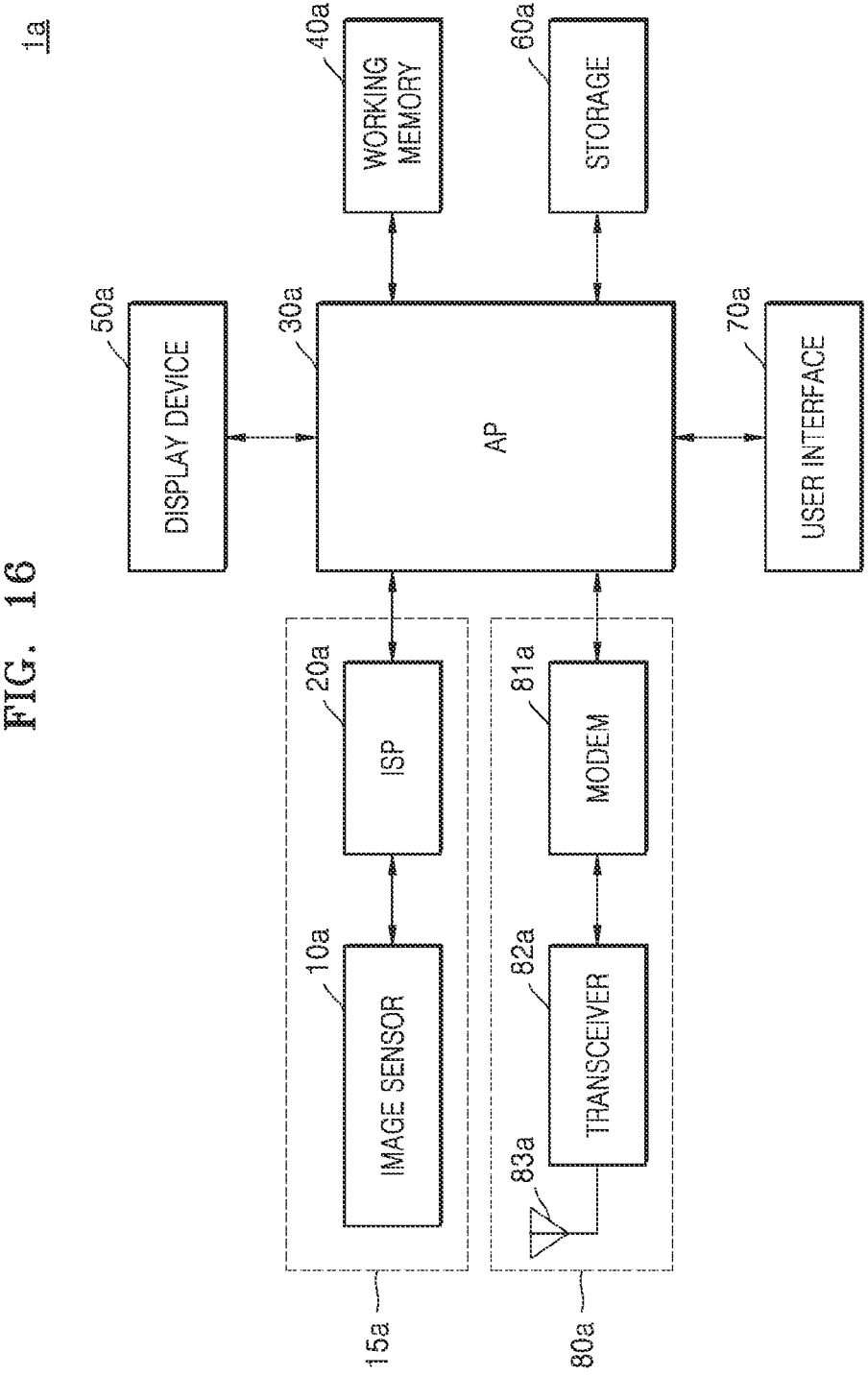

FIG. 16 is a block diagram illustrating an electronic device according to an embodiment.

DETAILED DESCRIPTION OF THE EMBODIMENTS

Embodiments of the inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

It will be understood that when a component such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. Other words used to describe the relationships between components should be interpreted in a like fashion.

Figure 1:
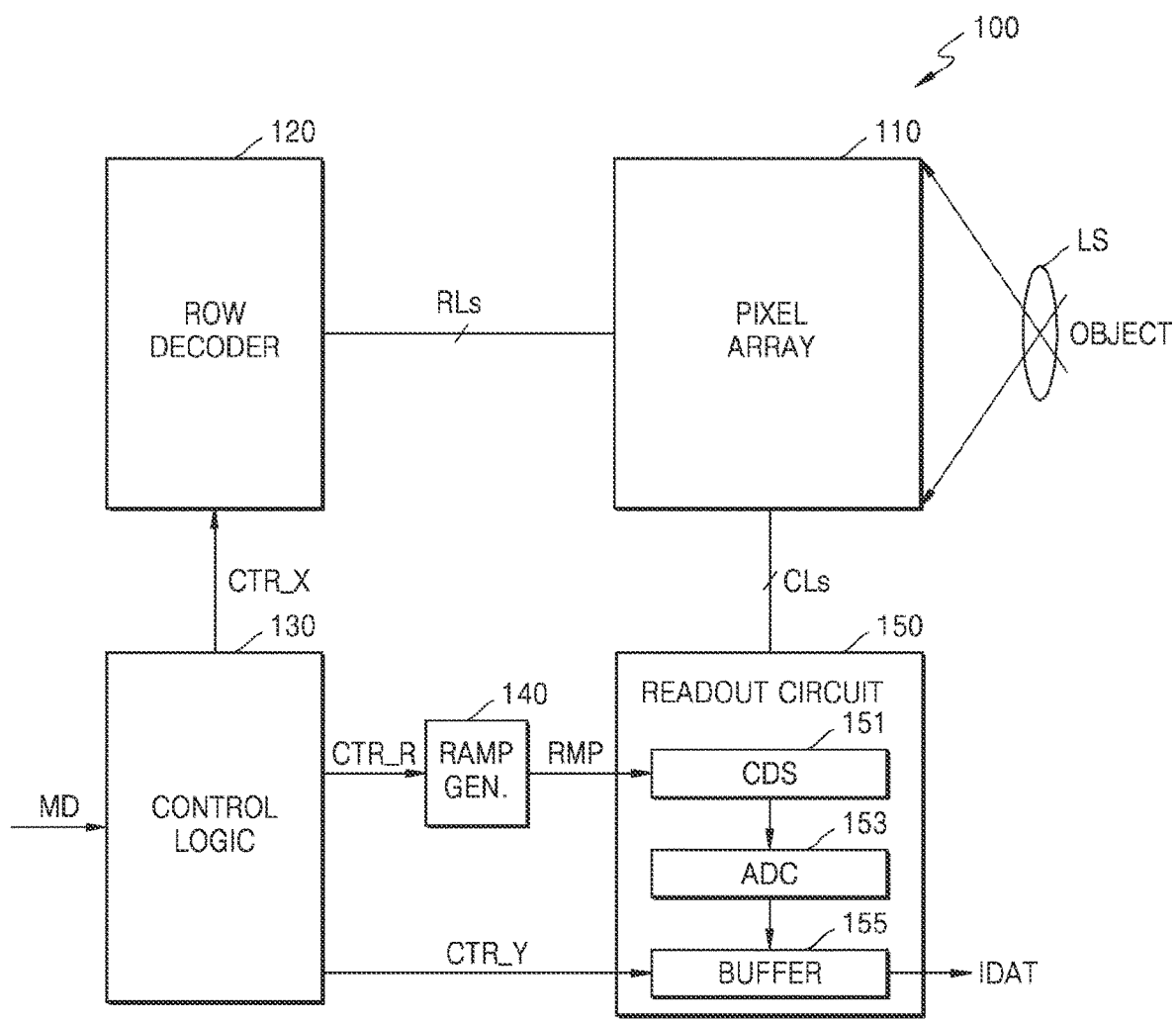
FIG. 1 is a block diagram illustrating an image sensor according to an embodiment.

FIG. 1 is a block diagram illustrating an image sensor 100 according to an embodiment.

The image sensor 100 may be included in an electronic device having an image or light sensing function. For example, the image sensor 100 may be included in electronic devices such as, for example, Internet of Things (IoT) devices, home appliances, tablet personal computers (PCs), personal digital assistants (PDAs), portable multimedia players (PMPs), navigation devices, drones, and advanced driver assistance systems (ADASs). Also, the image sensor 100 may be included in an electronic device which is provided as an element in vehicles, furniture, manufacturing equipment, doors, various kinds of measurement devices, etc. However, the image sensor 100 is not limited thereto.

The image sensor 100 may include a lens LS, a pixel array 110, a row decoder 120, a control logic 130, a ramp generator 140, and a readout circuit 150. In an embodiment, the image sensor 100 may further include a clock signal generator, a signal processor, a column decoder, and/or a memory.

The image sensor 100 may convert an optical signal of an object, input through an optical device, into an electrical signal, and may generate image data DATA based on the electrical signal. The optical device may include an optical collection device including a mirror and the lens LS. For example, the image sensor 100 may collect light, reflected by the object, through various paths by using an optical characteristic such as the dispersion or refraction of light, or may use the optical device for changing a movement path of light. For convenience of explanation, embodiments are described herein in which the lens LS is utilized. However, as described above, embodiments of the inventive concept may be implemented with various optical devices in addition to the lens LS.

The pixel array 110 may include a complementary metal oxide semiconductor (CMOS) image sensor (CIS), which converts an optical signal into an electrical signal. An optical signal passing through the lens LS may be transferred to a light receiving surface of the pixel array 110 and may form an image of the object. The pixel array 110 may adjust the sensitivity of the optical signal under the control of a control logic 130.

The pixel array 110 may be connected to a plurality of row lines RLs and a plurality of column lines CLs, which transfer signals to the pixels of the pixel array 110, which are arranged in a matrix form. For example, each of the row lines RLs may respectively transfer control signals, output from the row decoder 120, to transistors included in a pixel, and may transfer pixel signals of pixels to the readout circuit 150 by column units of the pixel array 110. Each of the plurality of column lines CLs may extend in a column direction and may connect pixels, disposed in the same column, to the readout circuit 150.

Each of the plurality of pixels of the pixel array 110 may include at least one optical-to-electro conversion device and transistor. For example, the pixel array 110 may be implemented with an optical-to-electro conversion device (or an optical sensing device) such as a charge coupled device (CCD) or a CMOS, and moreover, may be implemented with various kinds of optical-to-electro conversion devices. According to an embodiment, the optical-to-electro conversion device may sense light and may convert the sensed light into a photocharge. For example, the optical-to-electro conversion device may include an optical sensing device, including an organic material or an inorganic material, such as an inorganic photodiode, an organic photodiode, a perovskite photodiode, a phototransistor, a photogate, or a pinned photodiode. In an embodiment, the transistor may transfer an electric charge stored in the optical-to-electro conversion device, reset the electric charge to a source voltage, or convert the electric charge into an electrical signal.

A micro-lens and a color filter may be stacked on each of the plurality of pixels, and a plurality of color filters of the plurality of pixels may configure a color filter array. The color filter may transmit light of a certain color among pieces of light incident through the micro-lens, and for example, may transmit a wavelength of a certain color area. A color capable of being sensed by a pixel may be determined based on a color filter included in the pixel. However, the inventive concept is not limited thereto. For example, in an embodiment, an optical-to-electro conversion device included in a pixel may convert light, corresponding to a wavelength of a color area, into an electrical signal based on a level of an electrical signal applied thereto (for example, a voltage level), whereby a color capable of being sensed by the pixel may be determined based on a level of an electrical signal applied to the optical-to-electro conversion device.

In an embodiment, each of the plurality of pixels of the pixel array 110 may include a micro-lens and at least one optical-to-electro conversion device disposed in parallel under the micro-lens. For example, each of the plurality of pixels may include at least one first optical-to-electro conversion device and at least one second optical-to-electro conversion device, which are disposed in parallel. Each pixel may output a first image signal generated from the first optical-to-electro conversion device or a second image signal generated from the second optical-to-electro conversion device. Also, each pixel may output a sum image signal generated from the first optical-to-electro conversion device and the second optical-to-electro conversion device.

The plurality of pixels may include a color pixel (for example, a red pixel, a green pixel, and a blue pixel). The color pixel may generate an image signal which includes corresponding color information based on light passing through different color filters. In an embodiment, a color filter generating different pieces of color information, a color pixel generating an image signal including different pieces of color information, or a set of color pixels may be referred to as a color channel. For example, a red channel may be referred to as a red filter or a red pixel which is a pixel for processing light passing through the red filter, a blue channel may be referred to as a blue filter or a blue pixel which is a pixel for processing light passing through the blue filter, and a green channel may be referred to as a green filter or a green pixel which is a pixel for processing light passing through the green filter. In embodiments described herein, colors such as red, green, and blue are described. However, the inventive concept is not limited thereto.

For example, in an embodiment, the plurality of pixels may include pixels based on a combination of different colors such as, for example, a yellow pixel, a cyan pixel, and a white pixel.

The red pixel may generate an image signal (or electric charges) corresponding to a red color signal in response to wavelengths of a red area in a visible light area. The green pixel may generate an image signal (or electric charges) corresponding to a green color signal in response to wavelengths of a green area in the visible light area. The blue pixel may generate an image signal (or electric charges) corresponding to a blue color signal in response to wavelengths of a blue area in the visible light area. However, the inventive concept is not limited thereto. For example, in an embodiment, the plurality of pixels may further include a white pixel. As another example, in an embodiment, the plurality of pixels may include a cyan pixel, a yellow pixel, a magenta pixel, or a white pixel.

Under the control of the control logic 130, for example, by way of a row control signal CTR_X, the row decoder 120 may generate control signals for driving the pixel array 110 and may drive the plurality of pixels of the pixel array 110 by row units through the plurality of row lines RLs. Each of the plurality of row lines RLs may extend in a row direction and may be connected to pixels disposed in the same row.

In an embodiment, the row decoder 120 may control the plurality of pixels so that the plurality of pixels of the pixel array 110 sense pieces of light incident simultaneously or by row units. Also, the row decoder 120 may select pixels by row units from among the plurality of pixels, provide a reset signal to the selected pixels (for example, pixels of one row), and output sensing voltages, generated by the selected pixels, through the plurality of column lines CLs.

The control logic 130 may provide control signals for controlling timings of the row decoder 120, the ramp generator 140, and the readout circuit 150. For example, the control logic 130 may provide the row control signal CTR_X to the row decoder 120, and the row decoder 120 may sense the pixel array 110 by row units through the row lines RLs based on the row control signal CTR_X. For example, the control logic 130 may provide the ramp generator 140 with a ramp control signal CTR_R for controlling a ramp signal, and the ramp generator 140 may generate a ramp signal RMP for an operation of the readout circuit 150 based on the ramp control signal CTR_R. For example, the control logic 130 may provide a column control signal CTR_Y to the readout circuit 150, and the readout circuit 150 may receive and process a pixel signal from the pixel array 110 through the column lines CLs based on the column control signal CTR_Y.

According to an embodiment, the control logic 130 may overall control the image sensor 100 based on a mode signal MD. For example, the control logic 130 may receive the mode signal MD, indicating high resolution sensing or low resolution sensing, from an application processor and may output the row control signal CTR_X, the column control signal CTR_Y, and the ramp control signal CTR_R so that each of the plurality of pixels of the pixel array 110 outputs an independent pixel signal, and the pixel array 110 may output each of the plurality of pixels based on the row control signal CTR_X and the column control signal CTR_Y. Also, the readout circuit 150 may sample and process pixel signals based on the ramp signal RMP. For example, the application processor may provide a result, obtained by determining an imaging mode of the image sensor 100, as the mode signal MD based on various scenarios such as, for example, illuminance of an imaging environment, a resolution setting of a user, and a sensed or learned state.

The control logic 130 may be implemented with a processing circuit such as hardware including a logic circuit, or may be implemented with a combination of hardware and software such as a processor executing software performing a compression operation. For example, the control logic 130 may be implemented with a central processing unit (CPU) included in the image sensor 100 and an arithmetic logic unit (ALU), a digital signal processor (DSP), a microprocessor, an application specific integrated circuit (ASIC), and a control logic, which perform an arithmetic and logical operation and a bit shift operation, but is not limited thereto, and may assist an artificial neural network and may further use an accelerator and neural processing unit (NPU) each using the artificial neural network.

The ramp generator 140 may generate the ramp signal RMP, which has a certain slope and increases or decreases progressively, and may provide the ramp signal RMP to the readout circuit 150.

The readout circuit 150 may receive, through the column lines CLs, a pixel signal output from the pixel array 110 and may process the pixel signal to output image data IDAT. The readout circuit 150 may include a correlated double sampling (CDS) circuit 151, an analog-to-digital converting (ADC) circuit 153, and a buffer 155.

The CDS circuit 151 may include a plurality of comparators and may compare the pixel signal, received from the pixel array 110 through the plurality of column lines CLs, with the ramp signal RMP from the ramp generator 140. Each of the comparators may compare the received pixel signal with a buffered ramp signal RMP and may output a comparison result at a logic low level or a logic high level. For example, when a level of the ramp signal RMP is the same as that of the pixel signal, each of the comparators may output a comparison signal for shifting a first level (for example, a logic high level) to a second level (for example, a logic low level), and a time for shifting a level of the comparison signal may be determined based on a level of the pixel signal.

A plurality of pixel signals output from the plurality of pixels may have a deviation caused by a unique characteristic (for example, fixed pattern noise (FPN)) of each pixel and/or a deviation caused by a characteristic difference of a logic (for example, transistors for outputting an electric charge stored in an optical-to-electro conversion device in a pixel) for outputting a pixel signal from a pixel. As described above, an operation of calculating a reset voltage (or a reset component) and a sensing voltage (or a sensing component) each corresponding to a pixel signal and extracting a difference thereof (for example, a voltage difference) as a valid signal to compensate for a deviation between the plurality of pixel signals output through the plurality of column lines CLs component may be referred to as CDS. Each of the comparators may output a comparison result (for example, a comparison output) to which a CDS technique is applied.

As a result, the CDS circuit 151 may generate a comparison result to which the CDS technique is applied.

The ADC circuit 153 may convert a comparison result of the CDS circuit 151 into digital data to generate and output pixel values corresponding to the plurality of pixels by row units. The ADC circuit 153 may include a plurality of counters. The plurality of counters may be respectively connected to outputs of the plurality of comparators and may count comparison results output from the plurality of comparators. Each of the counters may count a logic high or low comparison result output from a corresponding comparator based on a counting clock in a reset conversion period for sensing a reset signal and an image conversion period for sensing a sensing signal and may output digital data (for example, a pixel value) based on a counting result. Each of the counters may include a latch circuit and a calculation circuit. The latch circuit may latch a code value received as a counting clock signal at a time for shifting a level of the comparison signal received from a corresponding comparator. The latch signal may latch each of a code value (for example, a reset value) corresponding to the reset signal and a code value (for example, an image signal value) corresponding to an image signal. The calculation circuit may perform an arithmetic operation on the reset value and the image signal value to generate an image signal value from which a reset level of a pixel is removed. Each of the counters may output the image signal value, from which a reset level of a pixel is removed, as a pixel value. However, the inventive concept is not limited thereto. For example, in an embodiment, each counter may be implemented with an up-counter and a calculation circuit, or an up/down-counter, or a bit-wise inversion counter, in which a count value increases sequentially based on a counting clock signal.

The buffer 155 may store a pixel value output from the ADC circuit 153. The buffer 155 may store digital data (for example, a pixel value) corresponding to each row. In an embodiment, the buffer 155 may temporarily store pieces of digital data output from the counters and may amplify and output the stored pieces of digital data. That is, the buffer 155 may include an output buffer. The buffer 155 may temporarily store the pieces of digital data output from each of the plurality of counters, and then, may sequentially or selectively output the stored pieces of digital data, and a sense amplifier may amplify and output the digital data received thereby. The buffer 155 may output amplified image data IDAT to the outside of the readout circuit 150 based on the column control signal CTR_Y of a column decoder for a column based on control by the control logic 130.

The buffer 155 may be implemented with, for example, static random access memory (SRAM), a latch, a flip-flop, or a combination thereof, but is not limited thereto. In an embodiment, the buffer 155 may be a memory and may be included in the ADC circuit 153.

In an embodiment, the image sensor 100 may support an auto focusing (AF) function and may use phase difference AF technology for auto focusing detection. A phase difference AF operation may be a method which senses a disparity of a phase of an image formed in the image sensor 100 to adjust focus. The phase difference AF operation may have a characteristic where all of a front pin and a rear pin increase in phase difference. In the phase difference AF operation, a phase difference value and direction information about a pin may be seen based on a sensed phase difference, and thus, focusing may be performed by moving a focus lens at a time. For example, the image sensor 100 may previously calculate a movement value of a lens based on a phase difference and direction information about a pin, and based thereon, may drive a focus lens at a time to perform focusing. Therefore, the image sensor 100 using the phase difference AF operation may perform fast focusing without the display shaking of an electronic view finder.

When the phase difference AF operation is utilized, there may be a problem corresponding to a position at which a phase detection pixel is disposed in the pixel array 110. When an excessive number of phase detection pixels are provided in the pixel array 110, the number of sensing pixels may be reduced, causing resolution degradation. When an excessively small number of phase detection pixels are provided in the pixel array 110, the image sensor 100 may be unable to detect an accurate phase difference. The image sensor 100 may support various imaging modes such as, for example, a live view mode, a static image mode, a moving image mode, a preview mode, and a high resolution capture mode. In the various imaging modes, a position of a sensing pixel for generating an image may be changed, and imaging performance of each mode may be changed based on the arrangement of a phase detection pixel. Therefore, according to embodiments, phase detection pixel arranging technology for increasing the imaging performance of the image sensor 100 may be utilized.

Figure 2:
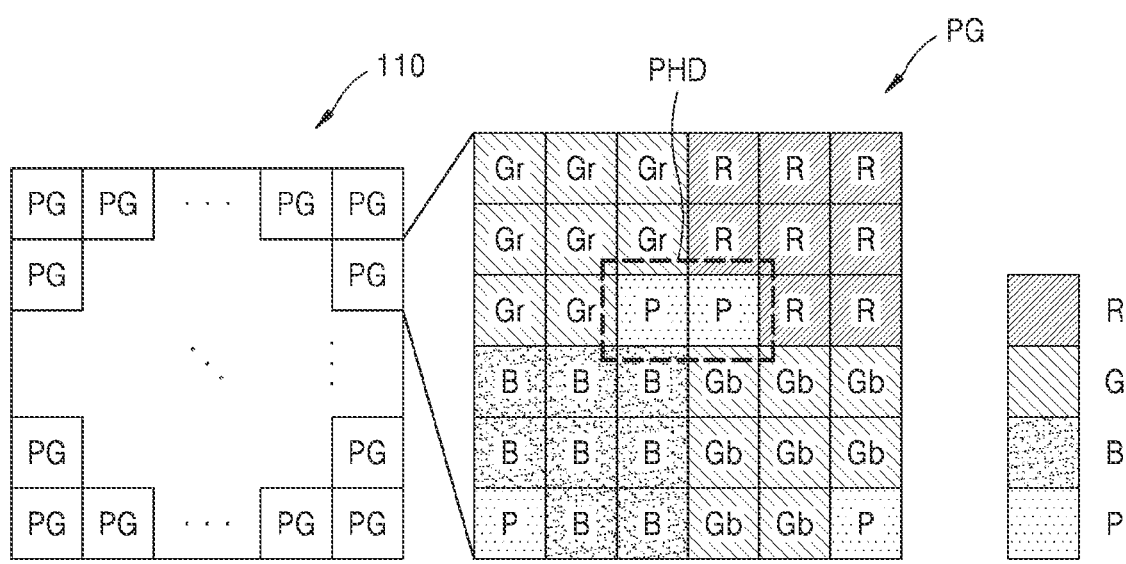
FIG. 2 is a diagram illustrating a pixel array according to an embodiment.

FIG. 2 is a diagram illustrating a pixel array 110 according to an embodiment.

Referring to FIG. 2, the pixel array 110 may include a plurality of pixel groups PG, which are repeatedly arranged. Each of the pixel groups PG may include a red channel, a green channel, and a blue channel and may be one color expression unit for reproducing an object (OBJECT in FIG. 1) based on a combination of a red channel, a green channel, and a blue channel.

In an embodiment, one pixel group PG may include a color pixel having a Bayer pattern including red, green, and blue. Each color pixel may include nine subpixels arranged in a 3×3 matrix, and each subpixel may receive light passing through the same color filter. A pixel group PG including nine red subpixels R, nine green subpixels Gr, nine blue subpixels B, and nine green subpixels Gb, arranged in a 3×3 matrix, may be referred to as a nano-cell. Hereinafter, a green subpixel Gr may be referred to as a first green subpixel, and a green subpixel Gb may be referred to as a second green subpixel. The first green pixels Gr and the second green pixels Gb may be collectively referred to as green pixels G. Thus, a green pixel G including green subpixels Gr may be referred to as a first green pixel, and a green pixel G including green subpixels Gb may be referred to as a second green pixel. In an embodiment, nine subpixels (e.g., a nano-cell) arranged in a 3×3 matrix is described for convenience of description, but the inventive concept is not limited thereto. For example, according to embodiments, a pixel group PG may be configured in a various number of combinations. For example, in an embodiment, a pixel group PG may be configured to have an M×N configuration, where M is a natural number equal to or greater than 2 and N is a natural number equal to or greater than 2.

The pixel group PG may include a phase detection pixel P, which is one of a plurality of subpixels included in a color pixel. According to an embodiment, the phase detection pixel P may be evenly disposed (or arranged) for each color channel (or color pixel). An image sensor (e.g., 100 of FIG. 1) may calculate a distance to an object based on a pixel signal difference (for example, disparity) between a pair of phase detection pixels P, and thus, may automatically detect a focus. Therefore, the phase detection pixel P may be arranged in the pixel array 110 by horizontal pair units or vertical pair units. In an embodiment, a horizontally arranged phase detection pixel pair PHD is described, but the inventive concept is not limited thereto. For example, according to embodiments, a phase detection pixel pair having various geometrical structures such as a vertical structure or a diagonal structure may be utilized.

According to an embodiment of the inventive concept, each color channel of the pixel group PG may include a same number of phase detection pixels P. That is, each of the plurality of color pixels may include a same number of phase detection pixels. For example, one pixel of the phase detection pixel pair PHD may be disposed at a right bottom end of a first green pixel, and the other pixel of the phase detection pixel pair PHD may be disposed at a left bottom end of a red pixel. Likewise, one pixel of another phase detection pixel pair may be disposed at a left bottom end of a blue pixel, and the other pixel of the other phase detection pixel pair may be disposed at a right bottom end of a second green pixel. The pixel group GP may be repeatedly arranged, and thus, a phase detection pixel P disposed at a left bottom end of a blue pixel may contact a phase detection pixel P, which is included in another pixel group PG and is disposed at a right bottom end of a second green pixel, to configure one pair.

According to an embodiment, a phase detection pixel P disposed in a first green pixel and a phase detection pixel P disposed in a red pixel may configure a phase detection pixel pair PHD. For example, a phase detection pixel P disposed at a right bottom end of a first green pixel may sense a left image of an object, and a phase detection pixel P disposed at a left bottom end of a red pixel may sense a right image of the object. Therefore, a disparity based on a phase difference between a left image and a right image of the same object may be calculated. The pixel group PG may be repeatedly arranged in the pixel array 110, and thus, a phase detection pixel P disposed at a left bottom end of a blue pixel and a phase detection pixel of a pixel group (for example, a second green pixel) disposed to the left from the pixel group PG may configure a phase detection pixel pair PHD and a phase detection pixel P disposed at a right bottom end of a second green pixel and a phase detection pixel of a pixel group (for example, a blue pixel) disposed to the right from the pixel group PG may configure a phase detection pixel pair PHD. In an embodiment, as an implementation example of a Bayer pattern, for convenience of description, it is described that a red pixel is disposed to the right of a first green pixel, a blue pixel is disposed at a lower side of the first green pixel, and a second green pixel is disposed at a diagonal side of the first green pixel, but the inventive concept is not limited thereto. For example, according to embodiments, positions of red, green, and blue pixels may be switched therebetween, or a white pixel may be provided instead of one of two green pixels, or a pixel may be implemented by a combination of different colors such as a yellow pixel and a cyan pixel.

According to an embodiment, the pixel array 110 may uniformly include a phase detection pixel P for each color pixel, and thus, relatively constant crosstalk between the phase detection pixel P and an adjacent pixel may occur. Constant crosstalk may be removed without separate correction, and thus, the performance of phase detection and the quality of an image may be increased. Crosstalk occurring between the phase detection pixel P and an adjacent pixel will be described in more detail with reference to FIGS. 7A to 7C.

Also, in the image sensor 100 according to an embodiment, each color pixel of the pixel array 110 may uniformly include the phase detection pixel P, and thus, the number of phase detection pixels P included in a color pixel may be reduced or minimized. As the number of subpixels sensing an object, except the phase detection pixel P, of each color pixel increases, a signal-to-noise ratio (SNR) of the image sensor 100 may be increased.

Figure 3A:
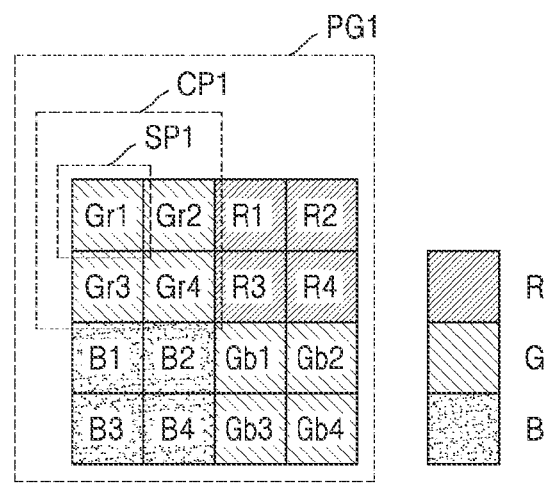
FIGS. 3A and 3B are diagrams illustrating a pixel group according to an embodiment.
Figure 3B:
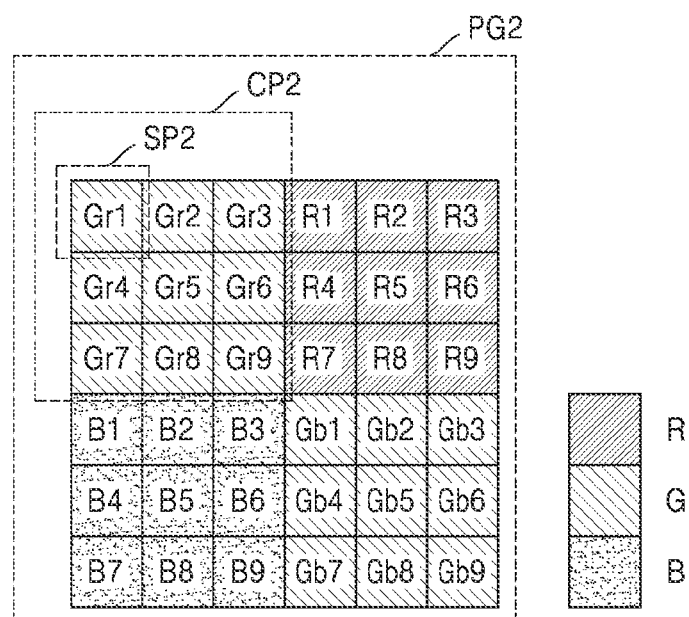

FIGS. 3A and 3B are diagrams illustrating a pixel group PG1 or PG2 according to an embodiment.

The terms "pixel groups PG1 and PG2", "color pixels CP1 and CP2", and "subpixels SP1 and SP2" used herein will be defined in more detail with reference to FIGS. 3A and 3B.

Referring to FIG. 3A, a first pixel group PG1 may include a plurality of color pixels having a Bayer pattern including red, green, and blue, and each of the color pixels may include four subpixels arranged in a 2×2 matrix. The first pixel group PG1 including four red subpixels R1 to R4, four green subpixels Gr1 to Gr4, four blue subpixels B1 to B4, and four green subpixels Gb1 to Gb4, arranged in a 2×2 matrix, may be referred to as a tetra-cell. The plurality of color pixels may be configured to sense pieces of light having different wavelength bands, as described herein.

The first pixel group PG1 may include two green pixels, one red pixel, and one blue pixel as color pixels. For example, a green pixel including the green subpixels GR1 to Gr4 disposed at a left side of a red pixel including the red subpixels R1 to R4 may be a first color pixel CP1.

The first color pixel CP1 may include a plurality of subpixels having the same color information. For example, a green pixel may be the first color pixel CP1 and may include four subpixels Gr1 to Gr4 arranged in a 2×2 matrix. The subpixel Gr1 disposed at a left top end of the first color pixel CP1 among a plurality of subpixels may be a first subpixel SP1.

Referring to FIG. 3B, a second pixel group PG2 may include a plurality of color pixels having a Bayer pattern including red, green, and blue, and each of the color pixels may include nine subpixels arranged in a 3×3 matrix. The second pixel group PG2 including nine red subpixels R1 to R9, nine green subpixels Gr1 to Gr9, nine blue subpixels B1 to B9, and nine green subpixels Gb1 to Gb9, arranged in a 3×3 matrix, may be referred to as a nano-cell.

The second pixel group PG2 may include two green pixels, one red pixel, and one blue pixel as color pixels. For example, a green pixel including the green subpixels Gr1 to Gr9 disposed at a left side of a red pixel including the red subpixels R1 to R9 may be a second color pixel CP2.

The second color pixel CP2 may include a plurality of subpixels having the same color information. For example, a green pixel may be the second color pixel CP2 and may include nine subpixels Gr1 to Gr9 arranged in a 3×3 matrix. The subpixel Gr1 disposed at a left top end of the second color pixel CP2 among a plurality of subpixels may be a second subpixel SP2.

In FIGS. 3A and 3B, in a tetra-cell or a nano-cell, it is illustrated that a pixel group, a color pixel, and a subpixel (for example, pixel groups PG1 and PG2, color pixels CP1 and CP2, and subpixels SP1 and SP2) are defined, but the inventive concept is not limited thereto. For example, embodiments of the inventive concept may be applied to subpixels, for example, subpixels arranged in an M×N matrix, based on a combination of a various number of subpixels included in each color pixel.

Figure 4:
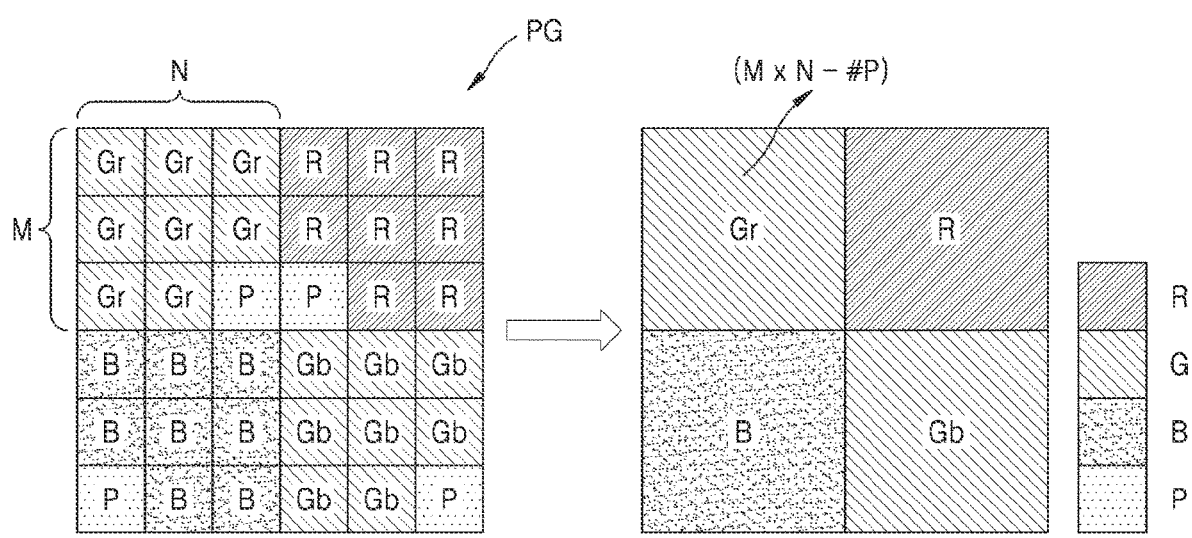
FIG. 4 is a diagram describing a data value of a color pixel including a subpixel according to an embodiment.

FIG. 4 is a diagram describing a data value of a color pixel including a subpixel according to an embodiment.

In FIG. 4, a nano-cell, which is a set of nine subpixels arranged in a 3×3 matrix, will be described as an example embodiment of the inventive concept. As described above, embodiments of the inventive concept may be applied to subpixels arranged in an M×N matrix.

Referring to FIG. 4, a pixel group PG may include a color pixel which includes a plurality of subpixels arranged in an M×N (MN) matrix. For example, the pixel group PG may include first and second green pixels, a red pixel, and a blue pixel. The first green pixel may include MN number of green subpixels Gr, the second green pixel may include MN number of green subpixels Gb, the red pixel may include MN number of red subpixels R, and the blue pixel may include MN number of blue subpixels B.

According to an embodiment, each color pixel (e.g., first and second green pixels, a red pixel, and a blue pixel) may include a same number of phase detection pixels P. The phase detection pixels P may be evenly arranged in each color pixel, and thus, relatively constant crosstalk may occur between each of the phase detection pixels P and an adjacent pixel. For example, one or more phase detection pixels P may be disposed at each of a right bottom end of the first green pixel, a left bottom end of the red pixel, a left bottom end of the blue pixel, and a right bottom end of the second green pixel, and each color channel may include a same number of phase detection pixels P.

In a scenario where a high-resolution image is not needed, a sufficient amount of light may be secured because the illuminance of an imaging environment is low, or fast image processing is utilized (for example, a preview image), sensing signals or pieces of sensing data of a plurality of subpixels included in color pixels may be summated. A case where analog signals generated by a plurality of optical sensing devices are summated may be referred to as analog addition, and a case where digital conversion results of sensing signals are summated may be referred to as digital addition. Analog addition will be described in more detail with reference to FIGS. 11 and 12, and digital addition will be described in more detail with reference to FIG. 13.

According to an embodiment, signal or data generated by one color channel may be summated as one piece of color pixel information. For example, each color pixel may include M×N (MN) number of subpixels. One of the subpixels may be a phase detection pixel P for calculating a disparity, and the other subpixels thereof may each be a sensing subpixel for sensing an image. Referring to the first green pixel according to an embodiment, sensing pixels corresponding to the number ((M×N)−#P) of the other subpixels, except the number (#P) of phase detection pixels, of the MN subpixels may be summated. A signal or data of a summated sensing pixel may include more information (for example, resolution, contrast, sensitivity, etc.) than a signal or data of each of a plurality of subpixels. Based on a similar manner, the red pixel, the blue pixel, and the second green pixel may be summated, and thus, more information than information included in individual subpixels may be generated.

Figure 5A:
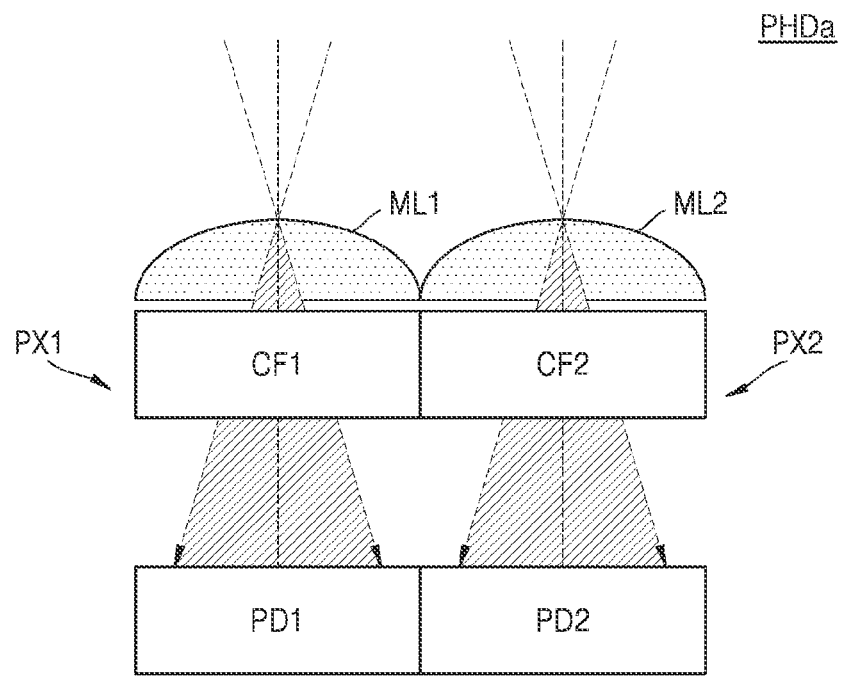
FIGS. 5A to 5C are cross-sectional views schematically illustrating a phase detection pixel pair according to an embodiment.
Figure 5B:
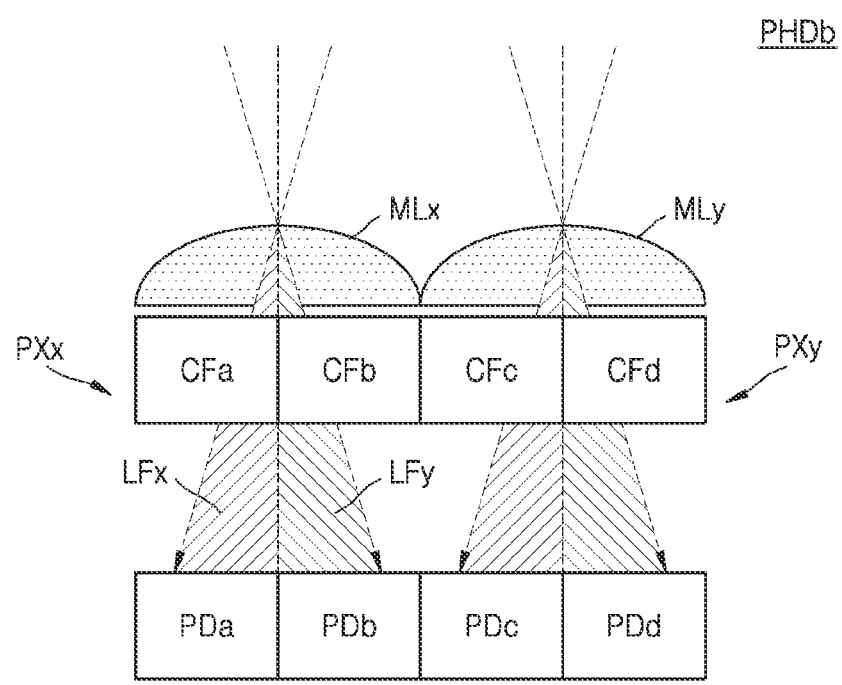
Figure 5C:
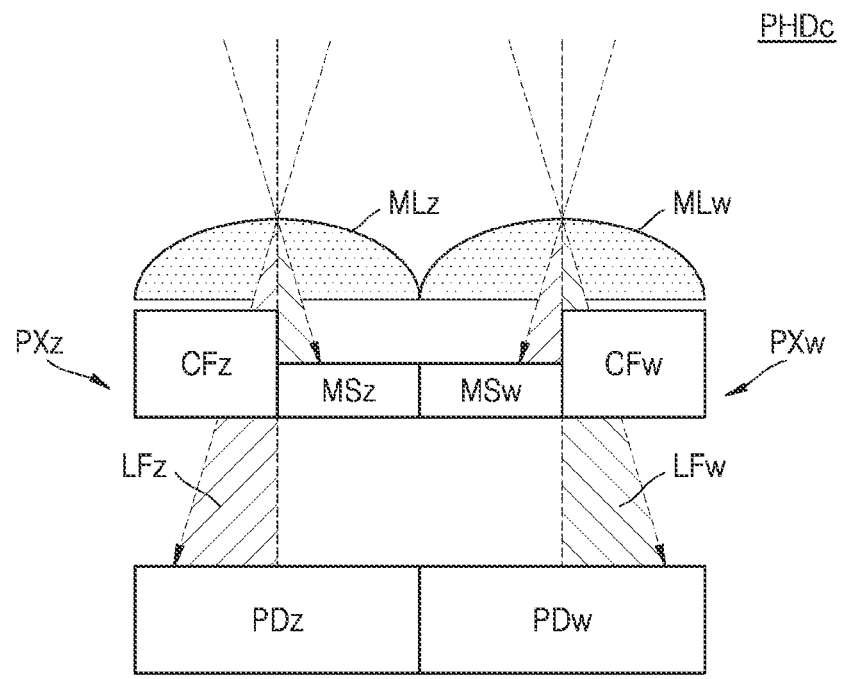

FIGS. 5A to 5C are cross-sectional views schematically illustrating phase detection pixel pairs PHDa, PHDb, and PHDc according to an embodiment. For convenience of explanation, in describing FIGS. 5A to 5C, repeated descriptions are omitted.

Referring to FIG. 5, the phase detection pixel pair PHDa may include a micro-lens, an optical sensing device, and a color filter. For example, as an implementation example of an optical sensing device, each of a plurality of pixels PX1 and PX2 may include a plurality of photodiodes PD1 and PD2 and a plurality of color filters CF1 and CF2, and a plurality of micro-lenses ML1 and ML2 may be provided on the color filters CF1 and CF2. A cross-sectional shape of a micro-lens ML according to an embodiment may be an arc having a curvature of a circle, or may be a portion of an oval.

According to an embodiment illustrated in FIG. 5A, one color filter CF1 or CF2 and one micro-lens ML1 or ML2 may be provided on one photodiode PD1 or PD2. For example, light incident on a center of the micro-lens ML1 may pass through the color filter CF1, and thus, only light of a certain wavelength band (for example, about 500 nm to about 600 nm corresponding to green) may be transmitted, and the transmitted light of the certain wavelength band may form an image in the photodiode PD1. Similarly, light incident on a center of the micro-lens ML2 may pass through the color filter CF2, and thus, only light having a certain wavelength may be transmitted, and the transmitted light having the certain wavelength may form an image in the photodiode PD2. As illustrated in FIG. 5A, a case where light incident on one micro-lens ML1 or ML2 forms an image in one photodiode PD1 or PD2 may be referred to as a single photodiode (single-PD). A plurality of pixels PX1 and PX2 may be paired and may configure the phase detection pixel PHDa, and an image sensor (e.g., 100 of FIG. 1) may calculate a disparity based on a phase difference between the photodiodes PD1 and PD2 by using the phase detection pixel PHDa to determine a distance to an object and to adjust a focal length.

Referring to FIG. 5B, the phase detection pixel pair PHDb may include a micro-lens, an optical sensing device, and a color filter. For example, a pixel PXx may include two color filters CFa and CFb and two photodiodes PDa and PDb respectively corresponding to the color filters CFa and CFb, and similarly, a pixel PXy may include two color filters CFc and CFd and two photodiodes PDc and PDd respectively corresponding to the color filters CFc and CFd.

According to an embodiment illustrated in FIG. 5B, the two color filters CFa and CFb and the two photodiodes PDa and PDb may be provided under one micro-lens MLx. For example, a first light flux LFx, which is a portion of light incident on a center of the micro-lens MLx, may pass through the color filter CFa and may form an image in the photodiode PDa, and a second light flux LFy, which is the other portion of the light incident on the center of the micro-lens MLx, may pass through the color filter CFb and may form an image in the photodiode PDb. A phenomenon similar to the pixel PXx may occur in the pixel PXy. As illustrated in FIG. 5B, a case where light incident on one micro-lens MLx or MLy forms an image in the two photodiodes PDa and PDb (or PDc and PDd) may be referred to as a dual photodiode.

Referring to FIG. 5C, the phase detection pixel pair PHDc may include a micro-lens, an optical sensing device, and a metal shield. For example, a pixel PXz may include one color filter CFz, one metal shield MSz, and one photodiode PDz, and similarly, a pixel PXw may include one color filter CFw, one metal shield MSw, and one photodiode PDw. The metal shield may include metal as a component thereof and may block the traveling or propagation of light.

According to an embodiment illustrated in FIG. 5C, a third light flux LFz, which is a portion of light incident on a center of the micro-lens MLz, may pass through the color filter CFz and may form an image in a portion of the photodiode PDz corresponding to the color filter CFz, and a path of light, which is the other portion of the light incident on the center of the micro-lens MLz, may be blocked by the metal shield MSz, and thus, an image is not formed in a portion of the photodiode PDz corresponding to the metal shield MSz. Similarly, a fourth light flux LFw, which is a portion of light incident on a center of the micro-lens MLw, may pass through the color filter CFw and may form an image in a portion of the photodiode PDw corresponding to the color filter CFw, and a path of light, which is the other portion of the light incident on the center of the micro-lens MLw, may be blocked by the metal shield MSw, and thus, an image is not formed in a portion of the photodiode PDw corresponding to the metal shield MSw. In an embodiment, an example where one color filter (for example, CFz) and one metal shield (for example, MSz) are included in one pixel (for example, PXz) is described for convenience of description, but based on a characteristic of a metal shield for blocking the traveling of light, a metal shield may be provided on or under a color filter, which is sufficiently provided by a width of a micro-lens (for example, MLz). As illustrated in FIG. 5C, a case where a portion of light incident on one micro-lens MLz or MLw is blocked by a metal shield may be referred to as a metal shield photodiode (PD).

Referring to FIG. 5C, because a portion of light is blocked by a metal shield, the first light flux (e.g., LFx of FIG. 5B) and the third light flux LFz may be similar with respect to the same object, and a disparity, corresponding to an object, of the phase detection pixel pair PHDb or PHDc, may be similar.

Figure 6A:
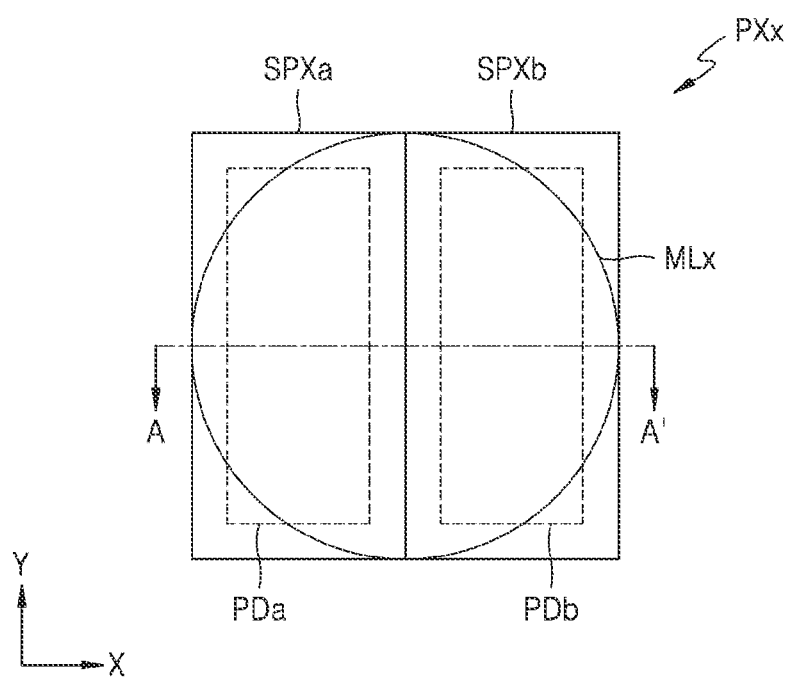
FIGS. 6A to 6C are plan views of a dual photodiode of FIG. 5B according to an embodiment.
Figure 6B:
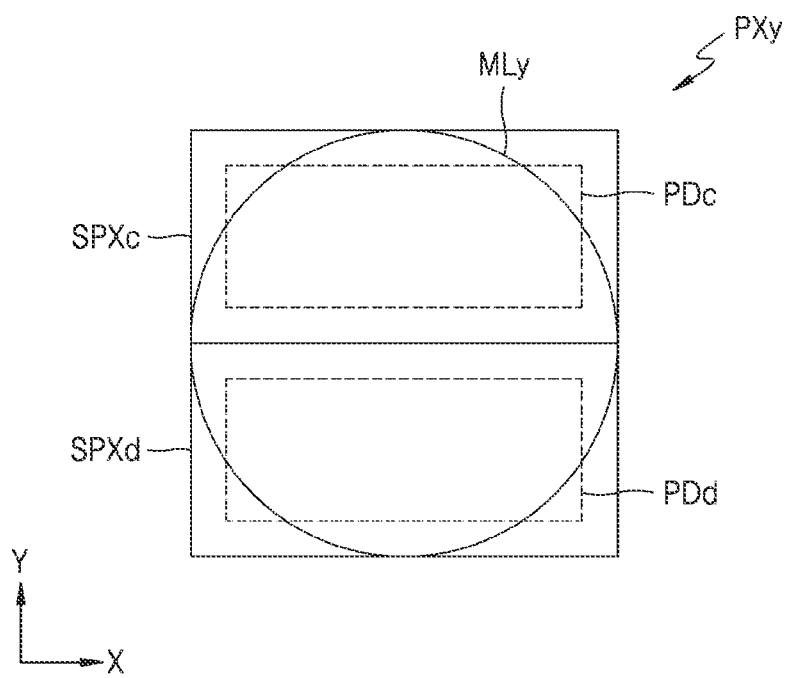
Figure 6C:
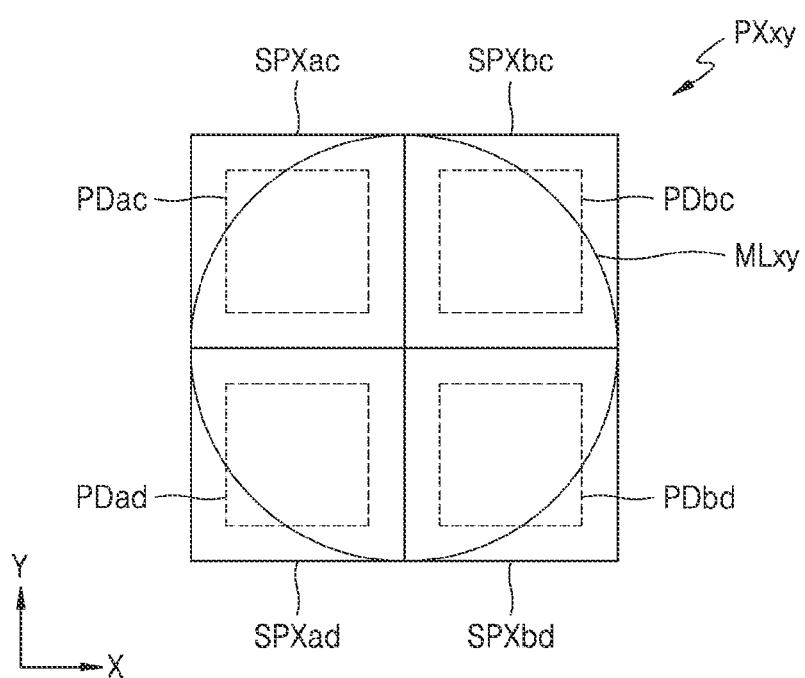
Figure 6D:
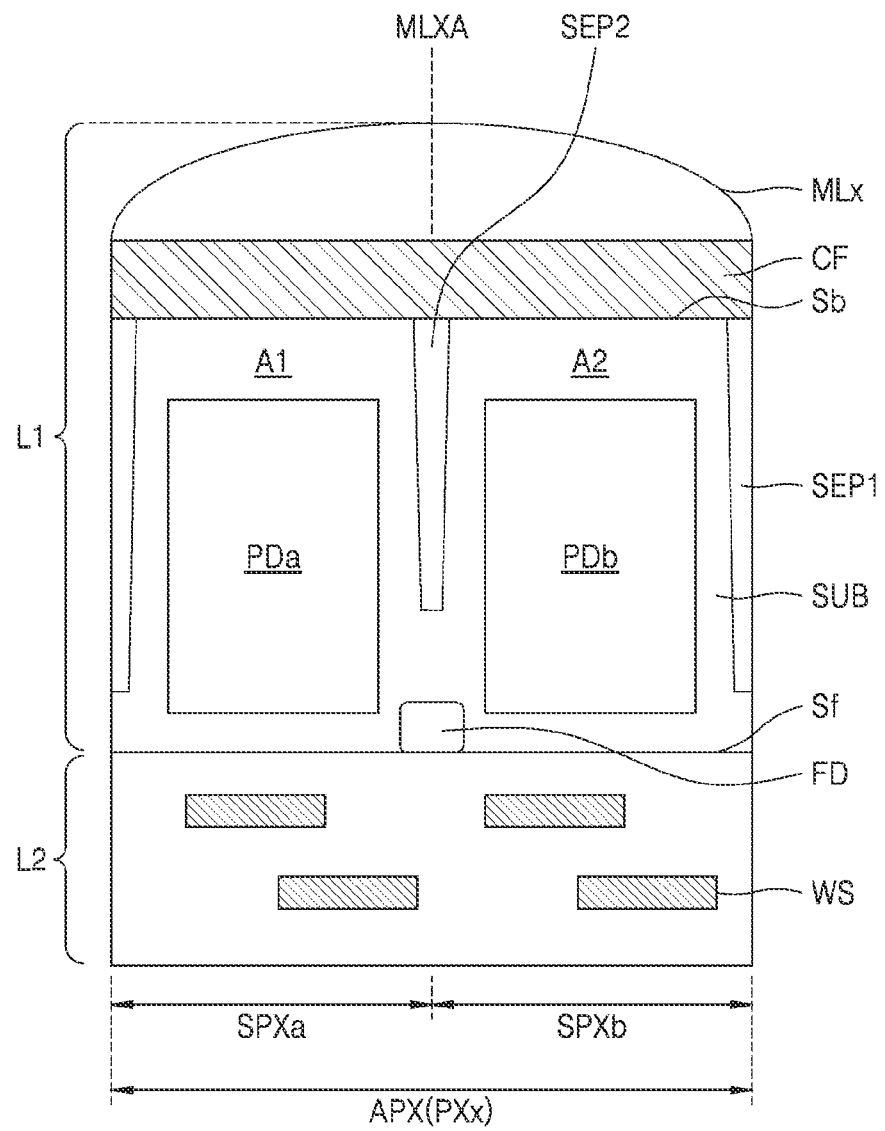
FIG. 6D is a cross-sectional view taken along line A-A' of FIG. 6A according to an embodiment.

FIGS. 6A to 6C are plan views of a dual photodiode of FIG. 5B according to an embodiment. FIG. 6D is a cross-sectional view taken along line A-A' of FIG. 6A according to an embodiment.

Referring to FIG. 6A, a pixel PXx may include a micro-lens MLx and two subpixels, for example, a first subpixel SPXa and a second subpixel SPXb. The first subpixel SPXa and the second subpixel SPXb may be disposed in parallel in a column direction, for example, a Y-axis direction (a second direction). For example, the first subpixel SPXa may be disposed in a left region in the pixel PXx, and the second subpixel SPXb may be disposed in a right region in the pixel PXx. The first subpixel SPXa and the second subpixel SPXb may respectively include a first photodiode PDa and a second photodiode PDb.

According to an embodiment, a sensing signal may be generated by each of the first photodiode PDa and the second photodiode PDb. For example, the first subpixel SPXa may output first image signals, and the second subpixel SPXb may output second image signals. A disparity based on the calculation of a phase difference may be calculated based on the first and second image signals, and thus, a horizontal direction of focus may be adjusted.

Referring to FIG. 6B, a pixel PXy may include a micro-lens MLy and two subpixels, for example, a third subpixel SPXc and a fourth subpixel SPXd. The third subpixel SPXc and the fourth subpixel SPXd may be disposed in parallel in a row direction, for example, an X-axis direction (a first direction). For example, the third subpixel SPXc may be disposed in an upper region in the pixel PXy, and the fourth subpixel SPXd may be disposed in a lower region in the pixel PXy. The third subpixel SPXc and the fourth subpixel SPXd may respectively include a third photodiode PDc and a fourth photodiode PDd. The third subpixel SPXc may output third image signals, and the fourth subpixel SPXd may output fourth image signals. A disparity based on the calculation of a phase difference may be calculated based on the third and fourth image signals, and thus, a vertical direction of focus may be adjusted.

Referring to FIG. 6C, a pixel PXxy may include a micro-lens MLxy and four subpixels, for example, a fifth subpixel SPXac, a sixth subpixel SPXbc, a seventh subpixel SPXad, and an eighth subpixel SPXbd. The fifth subpixel SPXac may be disposed at a left top in the pixel PXxy, the sixth subpixel SPXbc may be disposed at a right top in the pixel PXxy, the seventh subpixel SPXad may be disposed at a left bottom in the pixel PXxy, and the eighth subpixel SPXbd may be disposed at a right bottom in the pixel PXxy. In other words, the fifth subpixel SPXac and the sixth subpixel SPXbc may be disposed in a row direction, for example, an X-axis direction (a first direction), the seventh subpixel SPXad and the eighth subpixel SPXbd may be disposed in the row direction, the fifth subpixel SPXac and the seventh subpixel SPXad may be disposed in a column direction, for example, a Y-axis direction (a second direction), and the sixth subpixel SPXbc and the eighth subpixel SPXbd may be disposed in the column direction.

The fifth subpixel SPXac, the sixth subpixel SPXbc, the seventh subpixel SPXad, and the eighth subpixel SPXbd may each include one optical-to-electro conversion device, and for example, may respectively include a fifth photodiode PDac, a sixth photodiode PDbc, a seventh photodiode PDad, and an eighth photodiode PDbd. Comparing FIG. 6C with FIGS. 6A and 6B, in FIG. 6C, four photodiodes PDac, PDbc, PDad, and PDbd may be vertically and horizontally provided under one micro-lens MLxy, and thus, all of vertical and horizontal disparities may be calculated. A structure where four photodiodes PDac, PDbc, PDad, and PDbd are vertically and horizontally provided under one micro-lens MLxy may be referred to as a quad-cell.

Referring to FIG. 6D, a pixel PXx may include a first layer L1 and a second layer L2 stacked in a Z-axis direction, for example, a third direction. The first layer L1 may be referred to as an optical-to-electro conversion layer and may include a color filter CF and a micro-lens MLx formed on a substrate SUB, and two optical-to-electro conversion devices, for example, a first photodiode PDa and a second photodiode PDb, formed in the substrate SUB. For example, the first photodiode PDa and the second photodiode PDb may be embedded within the substrate SUB. In an embodiment, the first photodiode PDa and the second photodiode PDb may be completely embedded within (e.g., completely surrounded by) the substrate SUB. The second layer L2 may be referred to as a wiring layer, and a plurality of wirings WS may be formed in the second layer L2.

The substrate SUB may include, for example, a silicon wafer, a silicon on insulator (SOI) substrate, or a semiconductor epitaxial layer. The substrate SUB may include a first surface Sf and a second surface Sb disposed opposite to each other. For example, the first surface Sf may be a front surface of the substrate SUB, and the second surface Sb may be a rear surface of the substrate SUB. Light may be incident on the second surface Sb.

A plurality of pixel separation layers SEP1 and SEP2, for example, a deep trench isolation region or a P-type ion implantation region, extending from the second surface Sb of the substrate SUB toward the first surface Sf thereof, may be formed on the substrate SUB. The pixel separation layers SEP1 may be referred to as first pixel separation layers SEP1, and the pixel separation layers SEP2 may be referred to as second pixel separation layers SEP2. A pixel area APX, where the pixel PXx is formed, may be divided by the plurality of first pixel separation layers SEP1, which are relatively long in the Z direction, of the plurality of pixel separation layers SEP1 and SEP2. That is, relative to each other, the first pixel separation layers SEP1 are longer in the Z direction than the second pixel separation layers SEP2. Further, the pixel area APX may be divided into a first area A1 and a second area A2, where the first subpixel SPXa and the second subpixel SPXb are respectively formed, by a second pixel separation layer SEP2 which is relatively short compared to the first pixel separation layers SEP1. In an embodiment, each of the first area A1 and the second area A2 may be doped with first conductive type, for example, P-type, impurities. The first photodiode PDa and the second photodiode PDb may be respectively formed in the first area A1 and the second area A2. For example, a plurality of well regions doped with second conductive type, for example, N-type impurities, may be formed as the first photodiode PDa and the second photodiode PDb.

As illustrated, the first photodiode PDa and the second photodiode PDb may be disposed in a first direction, for example, an X direction, or a second direction, for example, a Y direction, with respect to an optical axis MLXA of the micro-lens MLx.

A floating diffusion node FD may be formed between the first photodiode PDa and the second photodiode PDb. In an embodiment, a plurality of transistors may be formed between each of the first photodiode PDa and the second photodiode PDb and the first surface Sf of the substrate SUB, and signals may be transferred and received to and from the transistors through the plurality of wirings WS of the wiring layer L2. This will be described in more detail with reference to FIGS. 11, 12A, and 12B.

Figure 7A:
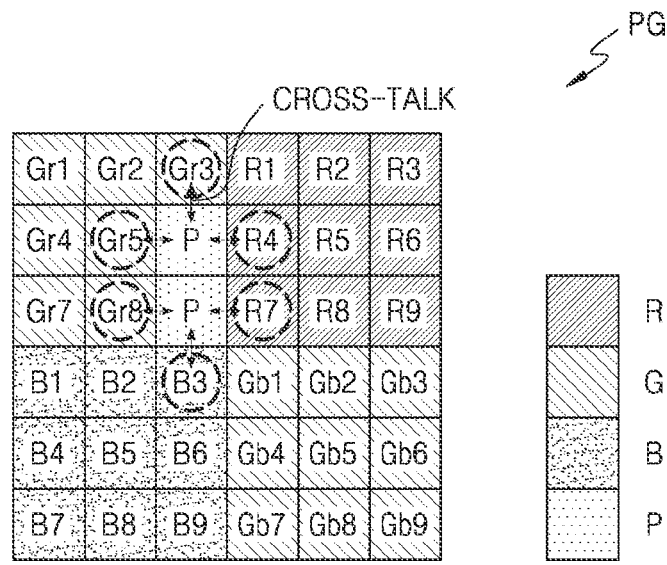
FIG. 7A is a diagram describing phase detection pixels which are not evenly arranged in each color pixel according to a comparative example.
Figure 7B:
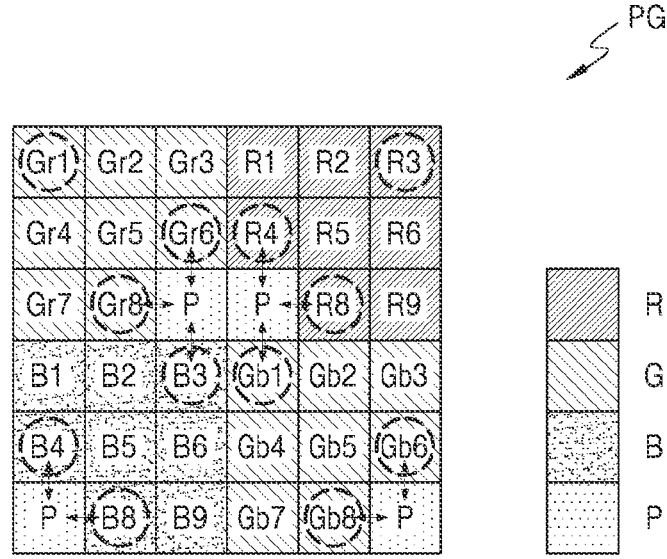
FIGS. 7B and 7C are diagrams describing phase detection pixels arranged evenly in each color pixel according to an embodiment.
Figure 7C:
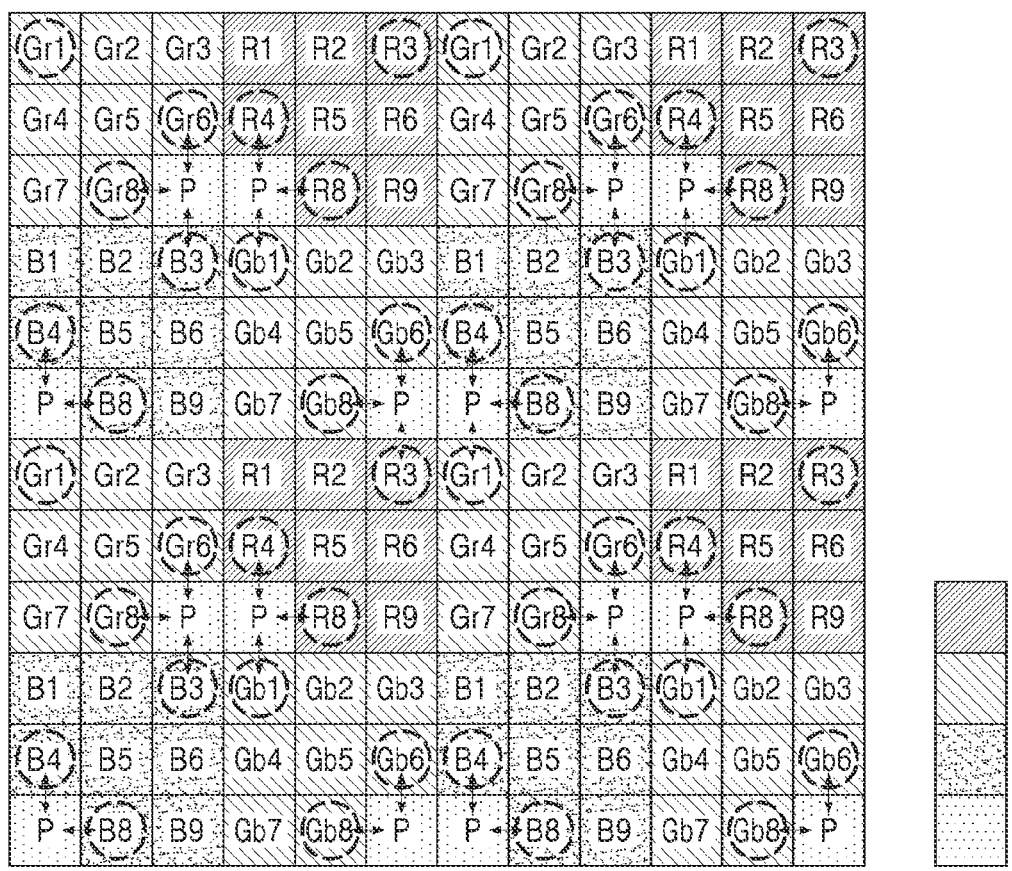

FIG. 7A is a diagram describing phase detection pixels which are not evenly arranged in each color pixel according to a comparative example. FIGS. 7B and 7C are diagrams describing phase detection pixels arranged evenly in each color pixel according to an embodiment.

Referring to FIG. 7A, a pixel group PG may include four color channels, for example, a first green pixel, a second green pixel, a red pixel, and a blue pixel. According to an embodiment, a phase detection pixel pair for calculating a vertical disparity may be disposed in a first green pixel Gr of the pixel group PG. For example, a phase detection pixel P may be disposed at each of positions at which a sixth green subpixel Gr6 and a ninth green subpixel Gr9 of nine green subpixels configuring the first green pixel Gr would be disposed.

Herein, a pixel including green subpixels denoted by Grx may be referred to as a first green Gr, a pixel including red subpixels denoted by Rx may be referred to as a red pixel, a pixel including blue subpixels Bx may be referred to as a blue pixel, and a pixel including green subpixels denoted by Gbx may be referred to as a second green pixel Gb, where x is a natural number.

Crosstalk may be caused from other subpixels directly adjacent to the phase detection pixel P. For example, a phase detection pixel P disposed at a position of the sixth green subpixel Gr6 of the phase detection pixel pair may be directly adjacent to other subpixels Gr3, Gr5, and R4, and a phase detection pixel P disposed at a position of the ninth green subpixel Gr9 of the phase detection pixel pair may be directly adjacent to other subpixels Gr8, B3, and R7. Therefore, photons accumulated into a subpixel directly adjacent to the phase detection pixel P or an undesired signal based on a sensing signal generated from the photons may be input to the phase detection pixel P, and may act as noise adversely affecting a phase detection function.

Four color channels may be provided in the pixel group PG, but in a case where the phase detection pixel is provided in only the first green pixel Gr, crosstalk occurring in each color channel may differ. For example, referring to FIG. 7A, three subpixels Gr3, Gr5, and Gr8 causing crosstalk may be provided in the first green pixel Gr, two subpixels R4 and R7 causing crosstalk may be provided in the red pixel R, one subpixel B3 causing crosstalk may be provided in the blue pixel B, and an adverse effect of a subpixel causing crosstalk may be very small or may not substantially be provided in the second green pixel Gb. In FIG. 7A, a vertical phase detection pixel pair is illustrated for convenience of description, but considering the symmetry of a pixel group PG, it may be understood that a horizontal phase detection pixel pair may cause the same phenomenon.

Referring to FIG. 7B, a phase detection pixel P may be evenly disposed for each color channel in the pixel group PG. According to an embodiment, each of a first green pixel Gr, a red pixel R, a blue pixel B, and a second green pixel Gb may include one phase detection pixel P. A same number of phase detection pixels P may be disposed at a certain position for each color channel, and the amount of crosstalk caused from an adjacent pixel may be constant.

According to an embodiment, a phase detection pixel P included in one color channel may be disposed based on a position of a phase detection pixel P included in another color channel directly adjacent thereto. For example, a phase detection pixel P included in the first green pixel Gr may be disposed at a right bottom end of the first green pixel Gr based on a position (a left bottom end) of a phase detection pixel P of the red pixel R directly adjacent to the right. In an embodiment, the phase detection pixel P included in the first green pixel Gr may be disposed at a bottom end of the first green pixel Gr based on a position of a phase detection pixel P of the blue pixel B adjacent to a portion just under the first green pixel Gr. This will be described below in more detail with reference to FIG. 8A.

According to an embodiment, a phase detection pixel pair may be configured based on a vertical or horizontal combination of a phase detection pixel P disposed for each color channel. For example, a phase detection pixel pair for adjusting a horizontal focus may be configured based on a combination of a phase detection pixel P disposed at a right bottom end of the first green pixel Gr and a phase detection pixel P disposed at a left bottom end of a red pixel. In an embodiment, a phase detection pixel P included in the first green pixel Gr and a phase detection pixel P of the blue pixel B directly adjacent thereto may configure a vertical phase detection pixel pair, and thus, may adjust a horizontal focus. This will be described below in more detail with reference to FIG. 8A.

In an embodiment, for convenience of description, it is illustrated that two phase detection pixels P configuring a vertical or horizontal phase detection pixel pair are adjacent to each other, but the inventive concept is not limited thereto. For example, according to embodiments, the two phase detection pixels P configuring the vertical or horizontal phase detection pixel pair are apart from each other with one or more subpixels disposed therebetween.

According to an embodiment, a certain number of phase detection pixels P may be disposed at a certain position predetermined for each color pixel, and thus, the amount of crosstalk occurring in each color channel may be constant compared to a case where a phase detection pixel P is unevenly disposed in color pixel. For example, three subpixels Gr6, Gr8, and B3 causing crosstalk may be provided directly adjacent to a phase detection pixel P disposed at a right bottom end of the first green pixel Gr, and three subpixels R4, R8, and Gb1 causing crosstalk may be directly adjacent to a phase detection pixel P disposed at a left bottom end of the red pixel R. In FIG. 7B, it is illustrated that two subpixels B4 and B8 causing crosstalk are provided directly adjacent to a phase detection pixel P disposed at a left bottom end of a blue pixel B in one pixel group PG, but referring to FIG. 7B in conjunction with FIG. 7C, a subpixel Gr1, which is directly adjacent to a lower side of a blue pixel B and is disposed at a left top end of a first green pixel Gr of another pixel group, may cause crosstalk in a phase detection pixel P of a blue pixel. Similarly, it is illustrated that two subpixels Gb6 and Gb8 causing crosstalk are provided directly adjacent to a phase detection pixel P disposed at a right bottom end of a second green pixel Gb in one pixel group PG, but referring to FIG. 7C, a subpixel R3 disposed at a right top end of a red pixel R of another pixel group may cause crosstalk in a phase detection pixel P of a second green pixel Gb.

Referring to FIG. 7C in conjunction with FIG. 7B, a phase detection pixel P disposed at a left bottom end of a blue pixel and a phase detection pixel P disposed at a right bottom end of a second green pixel Gb included in another pixel group may be paired and may configure a phase detection pixel pair which adjusts a horizontal focus, and a phase detection pixel P disposed at a right bottom end of a second green pixel Gb and a phase detection pixel P disposed at a left bottom end of a blue pixel included in another pixel group may be paired and may configure a phase detection pixel pair which adjusts a horizontal focus.

A phase detection pixel P disposed at a certain predetermined position for each color channel may be disposed at the same position in another pixel group PG. For example, a phase detection pixel P disposed at a right bottom end of the first green pixel Gr may be disposed at a right bottom end of a first green pixel Gr in another pixel group PG identically, and moreover, a phase detection pixel P disposed at a left bottom end of the red pixel R may be disposed at a left bottom end of a red pixel R in another pixel group PG identically.

Referring again to FIG. 7B, three subpixels Gr6, Gr8, and Gr1 causing crosstalk may be provided in the first green pixel Gr, three subpixels R4, R8, and R3 causing crosstalk may be provided in the red pixel R, three subpixels B4, B8, and B3 causing crosstalk may be provided in the blue pixel B, and three subpixels Gb6, Gb8, and Gb1 causing crosstalk may be provided in the second green pixel Gb. According to an embodiment, a certain number of phase detection pixels P may be disposed at a certain position for each color pixel, and thus, the amount of crosstalk may be substantially the same and certain crosstalk may be efficiently removed without performing a separate correction process. Therefore, according to embodiments of the inventive concept, separate hardware or a digital logic implemented with a combination of hardware and software for correction may be omitted. Also, according to an embodiment, because a phase detection pixel P is evenly disposed at a certain position for each color channel, the number of phase detection pixels P included in a color channel may be reduced or minimized, and an SNR of a sensing signal may be increased.

FIGS. 8A to 8F are diagrams illustrating various embodiments of evenly arranged phase detection pixels P.

In FIGS. 8A to 8F, a nano-cell where a color pixel includes a plurality of subpixels arranged in a 3×3 matrix will be described. For convenience of explanation, in describing FIGS. 8A to 8F, repeated descriptions are omitted.

Figures 8A, 8B:
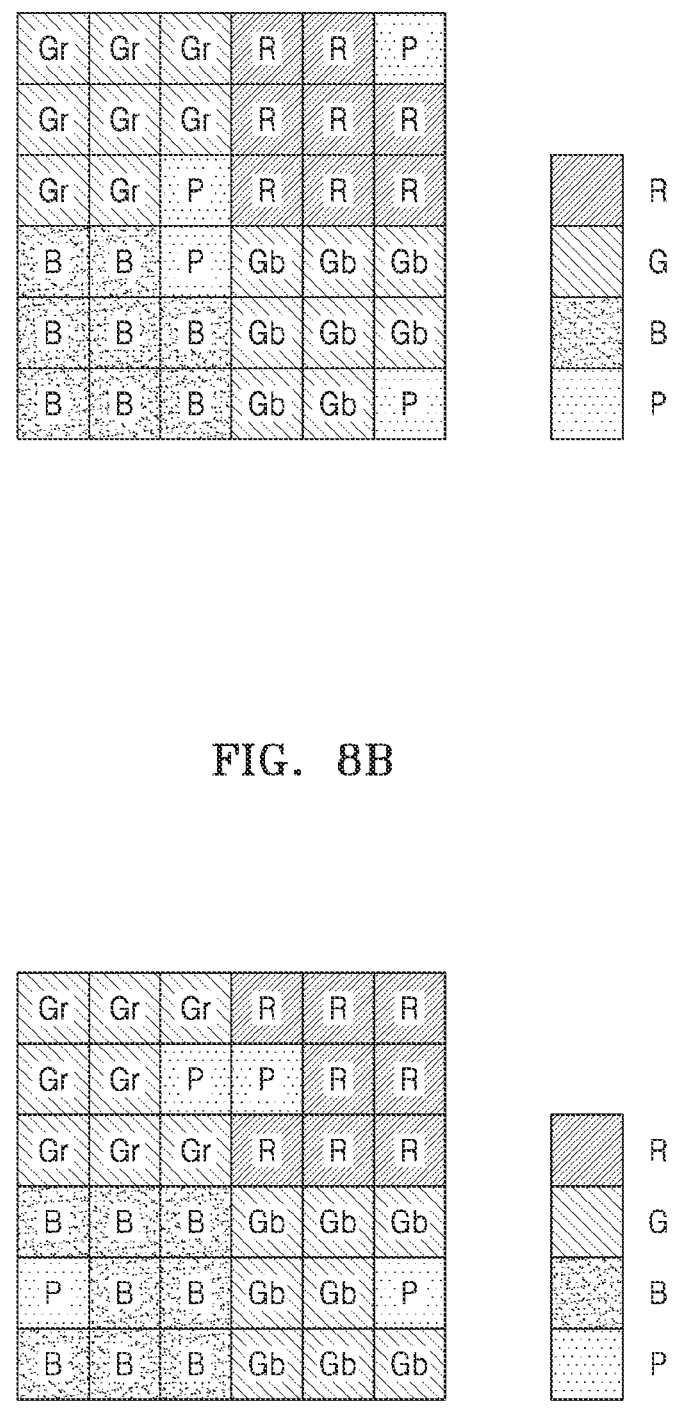

Referring to FIG. 8A, a phase detection pixel P included in a pixel group may be provided as one in each color channel, and phase detection pixels P included in color channels vertically adjacent to each other may configure a vertical phase detection pixel pair. For example, a phase detection pixel P included in a first green pixel Gr and a phase detection pixel P of a blue pixel B adjacent to a portion directly under the first green pixel Gr may configure a vertical phase detection pixel pair (e.g., PHD of FIG. 2). Similarly, a phase detection pixel P included in a red pixel R and a phase detection pixel P included in a second green pixel Gb of another pixel group directly adjacent to an upper side of the red pixel R may configure a vertical phase detection pixel pair. A vertical phase detection pixel pair may provide a vertical disparity of an object, and an image sensor (e.g., 100 of FIG. 1) may adjust a vertical focus of the object based on a result obtained by calculating a disparity.

Referring to FIG. 8B, a phase detection pixel P may be disposed at a middle side position instead of a corner (a side) (for example, FIGS. 7A, 7B, and 8A) of a color channel. For example, a phase detection pixel P included in a first green pixel Gr and a phase detection pixel P of a red pixel R directly adjacent to the right of the first green pixel Gr may configure a horizontal phase detection pixel pair (e.g., PHD of FIG. 2). Similarly, a phase detection pixel P included in a blue pixel B and a phase detection pixel P included in a second green pixel Gb of another pixel group directly adjacent to the left of the second green pixel Gb may configure a horizontal phase detection pixel pair, and a phase detection pixel P included in the second green pixel Gb and a phase detection pixel P included in a blue pixel B of another pixel group directly adjacent to the right of the second green pixel Gb may configure a horizontal phase detection pixel pair. Therefore, vertical focus of an object may be adjusted.

Figure 8C:

Referring to FIG. 8C in conjunction with FIG. 5C, a phase detection pixel P may include a metal shield (e.g., MSz or MSw of FIG. 5C). The metal shield MSz or MSw, as described above, may include a metal component and may block the traveling or propagation of light. The metal shield MSz or MSw may block a path of a portion of light incident on a center of a micro-lens (e.g., MLz or MLw of FIG. 5C) to prevent an image from being formed in a photodiode (e.g., PDz or PDw of FIG. 5C) at a corresponding blocked position.

According to an embodiment, a phase detection pixel P included in a first green pixel Gr and a phase detection pixel P included in a blue pixel B may configure a vertical phase detection pixel pair, a phase detection pixel P included in a red pixel R and a phase detection pixel P included in a second green pixel Gb of another pixel group may configure a vertical phase detection pixel pair, and a phase detection pixel P included in the second green pixel Gb and a phase detection pixel P included in a red pixel R of the other pixel group may configure a vertical phase detection pixel pair. A phase detection pixel P, disposed at a top, of two phase detection pixels P configuring a vertical phase detection pixel pair may include a color filter (e.g., CFz of FIG. 5C) at an upper portion and a metal shield (e.g., MSz of FIG. 5C) at a lower portion, and a phase detection pixel P, disposed at a bottom, of the two phase detection pixels P may include a color filter (e.g., CFw of FIG. 5C) at a lower portion and a metal shield (e.g., MSw of FIG. 5C) at an upper portion, whereby a vertical disparity may be detected.

Figure 8D:

Referring to FIG. 8D, a phase detection pixel P including a metal shield (e.g., MSz or MSw of FIG. 5C) may be paired with another phase detection pixel P to configure a vertical phase detection pixel pair. A phase detection pixel P of a metal shield-photodiode type illustrated in FIG. 8D may be similar to the arrangement of the phase detection pixels P described above with reference to FIG. 8B and may correspond to an embodiment to which the metal shield MSz or MSw described above with reference to FIG. 8C is applied. Thus, for convenience of explanation, repeated descriptions are omitted. A phase detection pixel P, disposed to the left, of two phase detection pixels P configuring a horizontal phase detection pixel pair may include a color filter (e.g., CFz of FIG. 5C) at a left portion and a metal shield (e.g., MSz of FIG. 5C) at a right portion, and a phase detection pixel P, disposed to the right, of the two phase detection pixels P may include a color filter (e.g., CFw of FIG. 5C) at a right portion and a metal shield (e.g., MSw of FIG. 5C) at a left portion, whereby a horizontal disparity may be detected.

Figure 8E:

Referring to FIG. 8E, all phase detection pixels P included in each color channel may be adjacent to one another. For example, a first green pixel Gr may include a phase detection pixel P at a right bottom end, a red pixel R may include a phase detection pixel P at a left bottom end, a blue pixel B may include a phase detection pixel P at a right top end, and a second green pixel Gb may include a phase detection pixel P at a left top end. Accordingly, all phase detection pixels P included in one pixel group may be adjacent to one another. Four adjacent phase detection pixels P may calculate all of a horizontal disparity and a vertical disparity, and an image sensor (e.g., 1100 of FIG. 1) may adjust all of a horizontal focus and a vertical focus of an object.

Figure 8F:

Referring to FIG. 8F, a phase detection pixel P included in a pixel group may be provided as one or more in each color channel. For example, each of a first green pixel Gr, a red pixel R, a blue pixel B, and a second green pixel Gb may include two phase detection pixels P. In the arrangement of the phase detection pixels P illustrated in FIG. 8F, a pattern where two phase detection pixels P are further provided in a horizontal direction may be provided, unlike the arrangement of the phase detection pixels P illustrated in FIG. 8E, but the inventive concept is not limited thereto.

According to an embodiment, a position of a phase detection pixel P included in one color filter may be symmetrical with a phase detection pixel P included in another color filter. For example, referring to FIG. 8A, a phase detection pixel P included in a first green pixel Gr may be symmetrical with a phase detection pixel P included in a red pixel R with respect to a widthwise line crossing a color filter, and the phase detection pixel P included in the first green pixel Gr may be symmetrical with (e.g., X-axis symmetricity) a phase detection pixel P included in a blue pixel with respect to a widthwise line crossing a pixel group. Also, the phase detection pixel P included in the first green pixel Gr and a phase detection pixel P included in a second green pixel Gb may be disposed at the same position. For example, referring to FIG. 8E, a phase detection pixel P included in a first green pixel Gr may be symmetrical with all of a phase detection pixel P included in a red pixel R, a phase detection pixel P included in a blue pixel, and a phase detection pixel P included in a second green pixel Gb with respect to a widthwise line and a lengthwise line each crossing a pixel group. Also, in addition to embodiments illustrated in FIGS. 8A to 8F, the inventive concept may be implemented by using various geometrical symmetrical structures where the amount of crosstalk in each color channel is constant.

A vertical or horizontal phase detection pixel pair illustrated in FIGS. 8A to 8D may be referred to as a 1×2 or 2×1 array micro-lens, a vertical or horizontal phase detection pixel pair illustrated in FIG. 8E may be referred to as a 2×2 array micro-lens, and a vertical or horizontal phase detection pixel pair illustrated in FIG. 8F may be referred to as a 2×4 matrix micro-lens.

FIG. 9 is a diagram illustrating various embodiments of evenly arranged phase detection pixels P.

In FIGS. 9A to 9F, a hexadeca-cell where a color pixel includes a plurality of subpixels arranged in a 4×4 matrix will be described. For convenience of explanation, in describing FIGS. 9A to 9F, repeated descriptions are omitted.

Figure 9A:
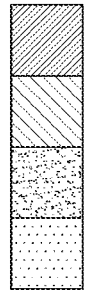
FIGS. 9A to 9F are diagrams illustrating various embodiments of evenly arranged phase detection pixels.

Referring to FIG. 9A, a phase detection pixel P included in a pixel group may be provided as one in each color channel, and phase detection pixels P included in color channels horizontally adjacent to each other may configure a horizontal phase detection pixel pair. For example, a phase detection pixel P included in a first green pixel Gr and a phase detection pixel P included in a red pixel R may configure a horizontal phase detection pixel pair, a phase detection pixel P included in a blue pixel B and a phase detection pixel P included in a second green pixel Gb of another pixel group directly adjacent to the left of the blue pixel B may configure a horizontal phase detection pixel pair, and a phase detection pixel P included in the second green pixel Gb and a phase detection pixel P included in a blue pixel B of another pixel group directly adjacent to the right of the phase detection pixel P included in the second green pixel Gb may configure a horizontal phase detection pixel pair.

Figure 9B:

Referring to FIG. 9B, phase detection pixels P included in color channels vertically adjacent to each other may configure a vertical phase detection pixel pair. For example, a phase detection pixel P included in a first green pixel Gr and a phase detection pixel P of a blue pixel B adjacent to a portion directly under the first green pixel Gr may configure a vertical phase detection pixel pair. Similarly, a phase detection pixel P included in a red pixel R and a phase detection pixel P included in a second green pixel Gb of another pixel group directly adjacent to a top of the red pixel R may configure a vertical phase detection pixel pair, and a phase detection pixel P included in the second green pixel Gb and a phase detection pixel P included in a red pixel R of another pixel group directly adjacent to a bottom of the second green pixel Gb may configure a vertical phase detection pixel pair.

Figure 9C:
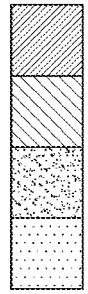

Referring to FIG. 9C in conjunction with FIGS. 5C and 8D, a phase detection pixel P may include a metal shield (e.g., MSz or MSw of FIG. 5C). According to an embodiment, a phase detection pixel P included in a first green pixel Gr and a phase detection pixel P included in a red pixel R may configure a horizontal phase detection pixel pair, a phase detection pixel P included in a blue pixel B and a phase detection pixel P included in a second green pixel Gb of a pixel group directly adjacent to the left of the blue pixel B may configure a horizontal phase detection pixel pair, and a phase detection pixel P included in the second green pixel Gb and a phase detection pixel P included in a blue pixel B of another pixel group directly adjacent to the right of the second green pixel Gb may configure a horizontal phase detection pixel pair.

Figure 9D:

Referring to FIG. 9D, a phase detection pixel P may be provided as two or more in each color channel. According to an embodiment, a phase detection pixel P may be disposed at a center of a color channel instead of a corner (a side) (for example, FIGS. 7A, 7B, and 9A) and a side (for example, FIG. 8B) of the color channel. For example, two or more phase detection pixels P included in a first green pixel Gr may be disposed inward from an edge (or a corner) of the first green pixel Gr and may be vertically disposed, thereby configuring a vertical phase detection pixel pair.

According to an embodiment, each color channel of a pixel group may have the same arrangement pattern as that of a phase detection pixel pair disposed in one color channel.

For example, each of a red pixel R, a blue pixel B, and a second green pixel Gb may include two or more phase detection pixels P and may have the same arrangement pattern as that of two or more phase detection pixels P disposed in the first green pixel Gr. Phase detection pixels P may be evenly arranged in each color channel, and thus, the amount of crosstalk caused from an adjacent pixel may be constant and constant crosstalk may be efficiently removed in each color channel.

Figure 9E:
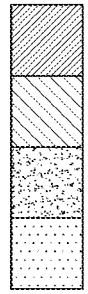

Referring to FIG. 9E, each color channel may include two or more phase detection pixels P, and phase detection pixels P of two different color channels may be disposed adjacent to one another. For example, the first green pixel Gr may include two phase detection pixels P which are arranged continuously and directly adjacent to each other in a vertical direction at a right bottom end thereof, and the red pixel R may include two phase detection pixels P which are arranged continuously and directly adjacent to each other in a vertical direction at a left bottom end thereof. Four adjacent phase detection pixels P included in the first green pixel Gr and the red pixel R may configure a vertical phase detection pixel and a horizontal phase detection pixel. Similarly, a blue pixel B may include two phase detection pixels P which are arranged continuously and directly adjacent to each other in a vertical direction at a right bottom end thereof, and a second green pixel Gb may include two phase detection pixels P which are arranged continuously and directly adjacent to each other in a vertical direction at a right bottom end thereof. Accordingly, four adjacent phase detection pixels P may configure a vertical phase detection pixel and a horizontal phase detection pixel.

Figure 9F:

Referring to FIG. 9F, each color channel may include two or more phase detection pixels P, and all of phase detection pixels P of four different color channels may be disposed directly adjacent to one another. For example, a first green pixel Gr may include phase detection pixels P at a left top end and a right bottom end thereof, a red pixel R may include phase detection pixels P at a left bottom end and a right top end thereof, a blue pixel B may include phase detection pixels P at a right top end and a left bottom end thereof, and a second green pixel Gb may include phase detection pixels P at a left top end and a right bottom end thereof. Accordingly, all of phase detection pixels P included in one pixel group may be directly adjacent to one another.

Figure 10:
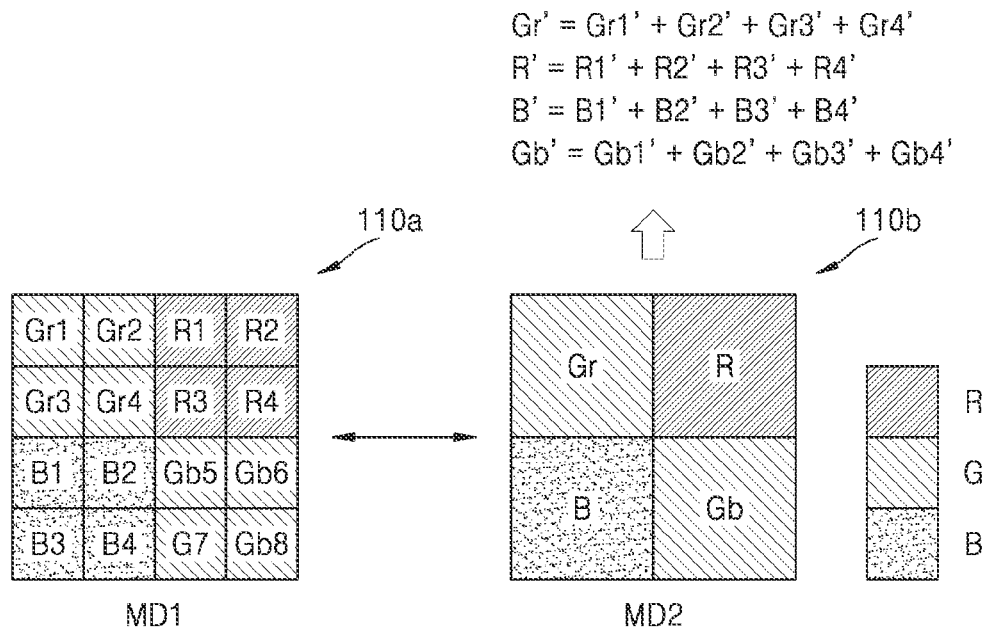
FIG. 10 is a diagram illustrating different data outputs in each mode according to an embodiment.

FIG. 10 is a diagram illustrating different data outputs in each mode according to an embodiment.

In FIG. 10, a tetra-cell, which is a set of four subpixels arranged in a 2×2 matrix, will be described as an example of the inventive concept. As described above, embodiments of the inventive concept may be applied to a nano-cell, a hexadeca-cell, or subpixels arranged in an M×N matrix.

Referring to FIG. 10, a pixel array 110a or 110b may output different pieces of data based on a mode. An image sensor (e.g., 100 of FIG. 1) may include a mode of photographing an object, and for example, may include a first mode MD1 or a second mode MD2. In addition, the image sensor 100 may further include various modes based on, for example, an imaging environment, an imaging setting, or an imaging scenario. According to an embodiment, a mode signal MD may be provided to a control logic (e.g., 130 of FIG. 1), and the control logic 130 may control the image sensor 100 to sense an object in the first mode MD1 or the second mode MD2.

According to an embodiment, the first mode MD1 may utilize a high-resolution image or may secure a sufficient amount of light because the illuminance of an imaging environment is high, or may be an imaging mode corresponding to a scenario utilizing accurate image processing (e.g., a capture image, etc.). The second mode MD2 may not utilize a high-resolution image or may not secure a sufficient amount of light because the illuminance of the imaging environment is low, or may be an imaging mode corresponding to a scenario utilizing fast image processing (e.g., a preview image, etc.).

According to an embodiment, the pixel array 110a may generate a sensing signal or sensing data corresponding to each of a plurality of subpixels included in a color pixel based on the first mode MD1. For example, the pixel array 110a may include first and second green pixels Gr and Gb, a red pixel R, and a blue pixel B, and each color pixel may include four subpixels. A plurality of subpixels included in each color channel may generate a sensing signal or sensing data as a result obtained by sensing an object. For example, each of four subpixels Gr1 to Gr4 included in the first green pixel Gr may generate a sensing signal or sensing data having a data expression depth (e.g., resolution or a data depth) of a corresponding subpixel as a maximum bandwidth and may output the generated sensing signal or sensing data to a readout circuit (e.g., 150 of FIG. 1).

According to an embodiment, the pixel array 110b may summate and output a sensing signal or sensing data corresponding to each of a plurality of subpixels included in a color pixel based on the second mode MD2. For example, the pixel array 110b may summate sensing signals or pieces of sensing data respectively generated by the four subpixels Gr1 to Gr4 included in the first green pixel Gr and may output a summated sensing signal or summated sensing data to the readout circuit (e.g., 150 of FIG. 1). For example, a sum value Gr' of sensing signals or pieces of sensing data of the first green pixel Gr may correspond to a sum "Gr1'+Gr2'+Gr3'+Gr4'" of the sensing signals or the pieces of sensing data of the four subpixels Gr1 to Gr4 included in the first green pixel Gr (Gr=Gr1+Gr2+Gr3+Gr4). Similarly, a sum value Gb' of sensing signals or pieces of sensing data of a second green pixel Gb may correspond to a sum "Gb1'+Gb2'+Gb3'+Gb4'" of the sensing signals or the pieces of sensing data of four subpixels Gb1 to Gb4 included in the second green pixel Gb, a sum value R' of sensing signals or pieces of sensing data of a red pixel R may correspond to a sum "R1'+R2'+R3'+R4'" of sensing signals or pieces of sensing data of four subpixels R1 to R4 included in a first red pixel R, and a sum value B' of sensing signals or pieces of sensing data of a blue pixel B may correspond to a sum "B1'+B2'+B3'+B4'" of sensing signals or pieces of sensing data of four subpixels B1 to B4 included in a first blue pixel B.

According to an embodiment, in a case where the pixel array 110a or 110b includes a phase detection pixel (e.g., P of FIG. 4), only sensing pixels, other than a phase detection pixel P, of a plurality of subpixels included in a color channel, may be summated. That is, a phase detection pixel P is not included in such a summation. A signal or data of a summated sensing pixel may include more information (e.g., resolution, contrast, sensitivity, etc.) than a signal or data of each of a plurality of subpixels. That is, according to the second mode MD2, even in a case where the amount of light is not sufficiently secured, brightness may increase and noise may decrease compared to a sensing result of each of individual subpixels, and thus, the quality of a captured image may be increased.

Figure 11:
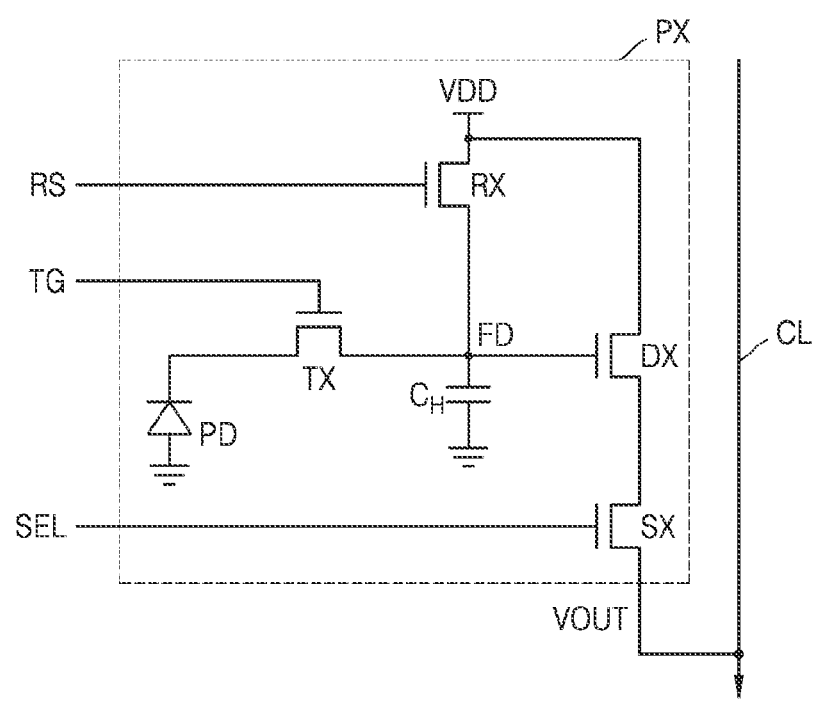
FIG. 11 is an equivalent circuit diagram of a pixel according to an embodiment.

FIG. 11 is an equivalent circuit diagram of a pixel PX according to an embodiment.

Referring to FIG. 11, the pixel PX may include an optical-to-electro conversion device and a plurality of transistors. The plurality of transistors may include, for example, a transfer transistor TX, a reset transistor RX, a driving transistor DX, and a selection transistor SX.

The optical-to-electro conversion device may include, for example, a photodiode PD. The optical-to-electro conversion device may include at least one of a photo transistor, a photogate, a pinned photodiode (PPD), and a combination thereof. The photodiode PD may include a P-N junction diode and may generate an electric charge, for example, an electron which is a negative electric charge and a hole which is a positive electric charge, in proportion to the amount of incident light, and may generate a photocharge based on the intensity of incident light. The transfer transistor TX may transfer the photocharge to a floating diffusion node FD based on a transfer control signal TG provided from a row decoder (e.g., 120 of FIG. 1).

The floating diffusion node FD (or a floating diffusion region) may model the photocharge by using a capacitor $C_H$ for storing the photocharge. The driving transistor DX may amplify the photocharge based on an electric potential based on the photocharge accumulated into the floating diffusion node FD and may transfer the amplified photocharge to the selection transistor SX.

The driving transistor DX may operate as a source follower. The driving transistor DX may receive, through a gate terminal thereof, a signal based on the amount of electric charge of the floating diffusion node FD (e.g., the electric potential of the floating diffusion node FD) and may buffer and output the received signal. The selection transistor SX may be turned on in response to a selection signal SEL applied to a gate terminal thereof. A drain electrode of the selection transistor SX may be connected to a source electrode of the driving transistor DX, and when the selection transistor SX is turned on in response to the selection signal SEL output from the row decoder 120, a pixel signal VOUT having a level corresponding to a voltage level of the floating diffusion node FD may be output to a column line CL connected to the pixel PX.

The reset transistor RX may reset the floating diffusion node FD based on a source voltage VDD according to the reset signal RS provided from the row decoder 120. The reset transistor RX may periodically reset electric charges accumulated into the floating diffusion node FD. A source electrode of the reset transistor RX may be connected to the floating diffusion node FD, and a drain electrode thereof may be connected to the source voltage VDD. When the reset transistor RX is turned on in response to the reset signal RS applied to a gate terminal thereof, a source voltage connected to a drain electrode of the reset transistor RX may be transferred to the floating diffusion node FD. When the reset transistor RX is turned on, the electric charges accumulated into the floating diffusion node FD may be discharged, and thus, the floating diffusion node FD may be reset.

Figure 12A:
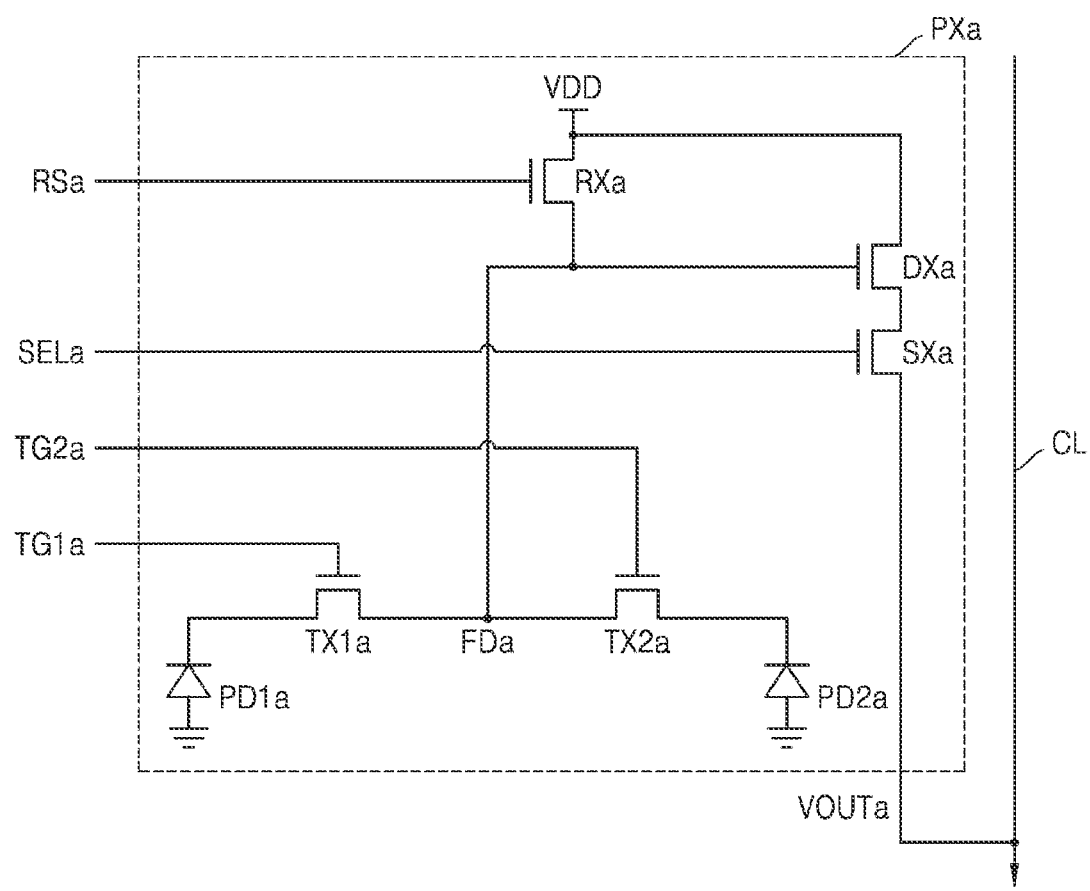
FIGS. 12A and 12B are circuit diagrams of a pixel performing an addition operation on a sensing signal according to an embodiment.
Figure 12B:
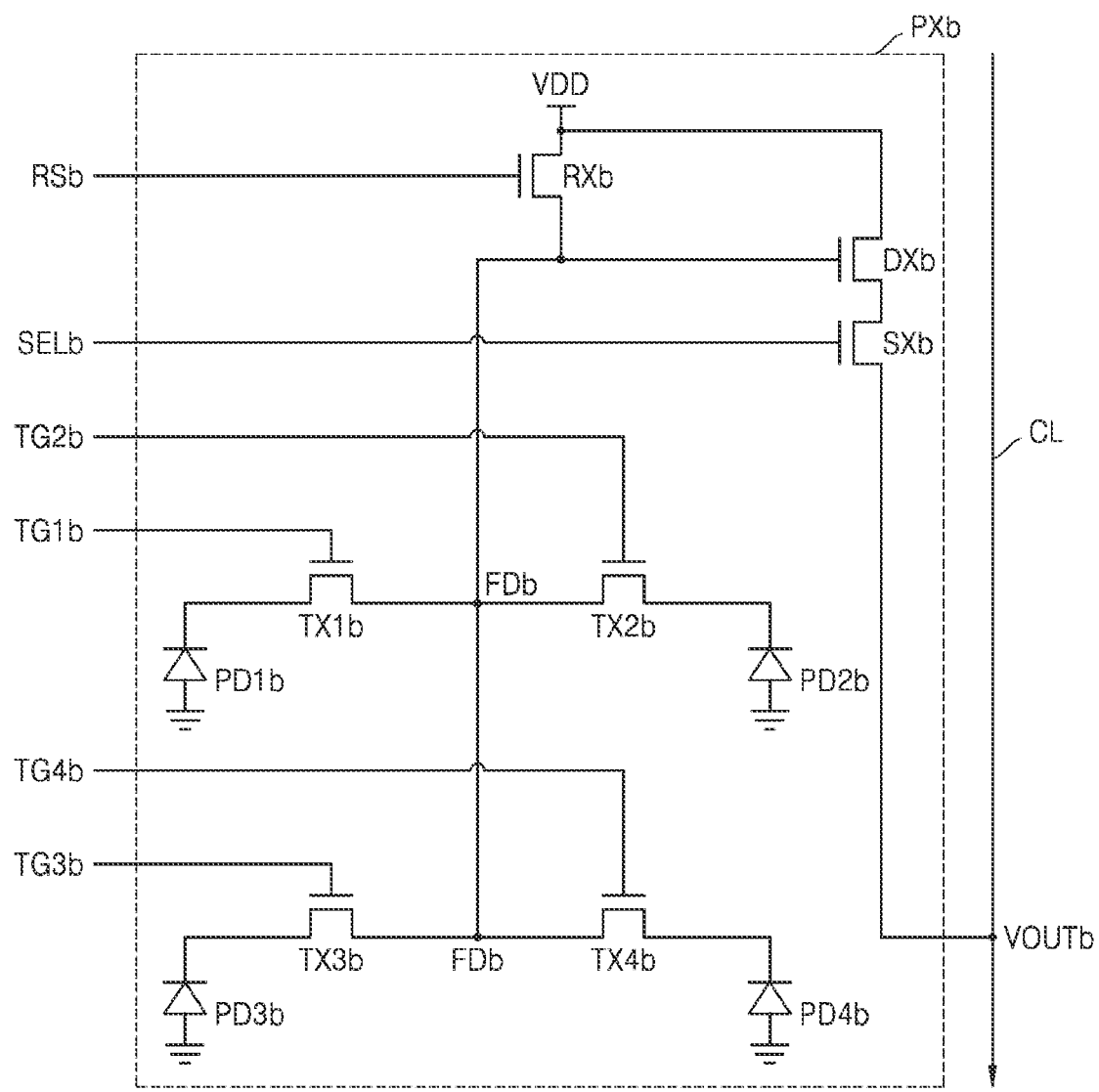

FIGS. 12A and 12B are circuit diagrams of a pixel PX performing an addition operation on a sensing signal according to an embodiment. For convenience of explanation, in describing FIGS. 12A and 12B, repeated descriptions are omitted. FIG. 12A illustrates an example of a pixel PXa where two subpixels (e.g., SPXa and SPXb of FIG. 6A) are summated, and FIG. 12B illustrates an example of a pixel PXb where four subpixels, for example, SPXac, SPXbc, SPXad, and SPXbd, are summated.

Referring to FIG. 12A, a pixel PXa may include a first photodiode PD1$a$, a second photodiode PD2$a$, a first transfer transistor TX1$a$, a second transfer transistor TX2$a$, a reset transistor RXa, a driving transistor DXa, and a selection transistor SXa. A selection signal SELa may control the selection transistor SXa.

A floating diffusion node FDa may be shared by the first photodiode PD1$a$, the second photodiode PD2$a$, the first transfer transistor TX1$a$, and the second transfer transistor TX2$a$. The first photodiode PD1$a$ and the first transfer transistor TX1$a$ may be referred to as a first subpixel (e.g., SPXa of FIG. 6A), and the second photodiode PD2$a$ and the second transfer transistor TX2$a$ may be referred to as a second subpixel (e.g., SPXb of FIG. 6A).

Each of the first photodiode PD1$a$ and the second photodiode PD2$a$ may generate a photocharge which varies based on the intensity of light. When the first transfer transistor TX1$a$ is turned on in response to a first transfer control signal TG1$a$ applied to a gate terminal thereof, an electric charge, for example, a photocharge, generated by the first photodiode PD1$a$ may be transferred to and stored in the floating diffusion node FDa. When the second transfer transistor TX2$a$ is turned on in response to a second transfer control signal TG2$a$ applied to a gate terminal thereof, the electric charge, for example, a photocharge, generated by the first photodiode PD1$a$ may be transferred to and stored in the floating diffusion node FDa. The electric charge stored in the floating diffusion node FDa may be output as an output voltage VOUTa.

The first transfer control signal TG1$a$ and the second transfer control signal TG2$a$ may be separate signals, and thus, a turn-on time of the first transfer transistor TX1$a$ and a turn-on time of the second transfer transistor TX2$a$ may be independently controlled by each of the first transfer control signal TG1$a$ and the second transfer control signal TG2$a$.

According to an embodiment, in the first mode MD1, the first transfer control signal TG1$a$ and the second transfer control signal TG2$a$ may be applied at different times, and the first transfer transistor TX1$a$ and the second transfer transistor TX2$a$ may be turned on at different times, whereby a photocharge of each of the first transfer transistor TX1$a$ and the second transfer transistor TX2$a$ may be stored in the floating diffusion node FDa. After one of the first transfer control signal TG1$a$ and the second transfer control signal TG2$a$ is applied, a reset signal RSa for resetting the floating diffusion node FDa may be applied, and then, the other of the first transfer control signal TG1$a$ and the second transfer control signal TG2$a$ may be applied.

According to an embodiment, in the second mode MD2, the first transfer control signal TG1$a$ and the second transfer control signal TG2$a$ may be applied at substantially the same time, and the first transfer transistor TX1$a$ and the second transfer transistor TX2$a$ may be turned on at substantially the same time, and thus, the photocharge of each of the first transfer transistor TX1$a$ and the second transfer transistor TX2$a$ may be stored in the floating diffusion node FDa.

Referring to FIG. 12B, the pixel PXb may include a plurality of optical-to-electro conversion devices, for example, four photodiodes (e.g., first to fourth photodiodes PD1$b$ to PD4$b$), first to fourth transfer transistors TX1$b$ to TX4$b$, a reset transistor RXb, a driving transistor DXb, and a selection transistor SXb. A reset signal RSb may control the reset transistor RXb, and a selection signal SELb may control the selection transistor SXb.

A micro-lens may be disposed on each of the first to fourth photodiodes PD1$b$ to PD4$b$. Therefore, a combination of a micro-lens and an optical-to-electro conversion device may be referred to as one pixel, and thus, the pixel PXb of FIG. 12 may correspond to a combination of four subpixels (e.g., PXxy of FIG. 6C).

A floating diffusion node FDb may be shared by four optical-to-electro conversion devices (e.g., the first to fourth photodiodes PD1b to PD4b) and the four transfer transistors TX1b to TX4b. The transfer transistors TX1b to TX4b may respectively connect or disconnect the four optical-to-electro conversion devices (e.g., the first to fourth photodiodes PD1b to PD4b) to or from the floating diffusion node FDb based on voltages of transfer control signals TG1b to TG4b.

Light incident on the optical-to-electro conversion devices (e.g., the first to fourth photodiodes PD1b to PD4b) may be accumulated as electric charges through optical-to-electro conversion. When electric charges accumulated into the first to fourth photodiodes PD1b to PD4b are transferred to the floating diffusion node FDb, the electric charges may be output as an output voltage VOUTb via the driving transistor DXb and the selection transistor SXb. The output voltage VOUTb corresponding to a voltage variation of the floating diffusion node FDb may be transferred to an external readout circuit (e.g., 150 of FIG. 1).

Figure 13:
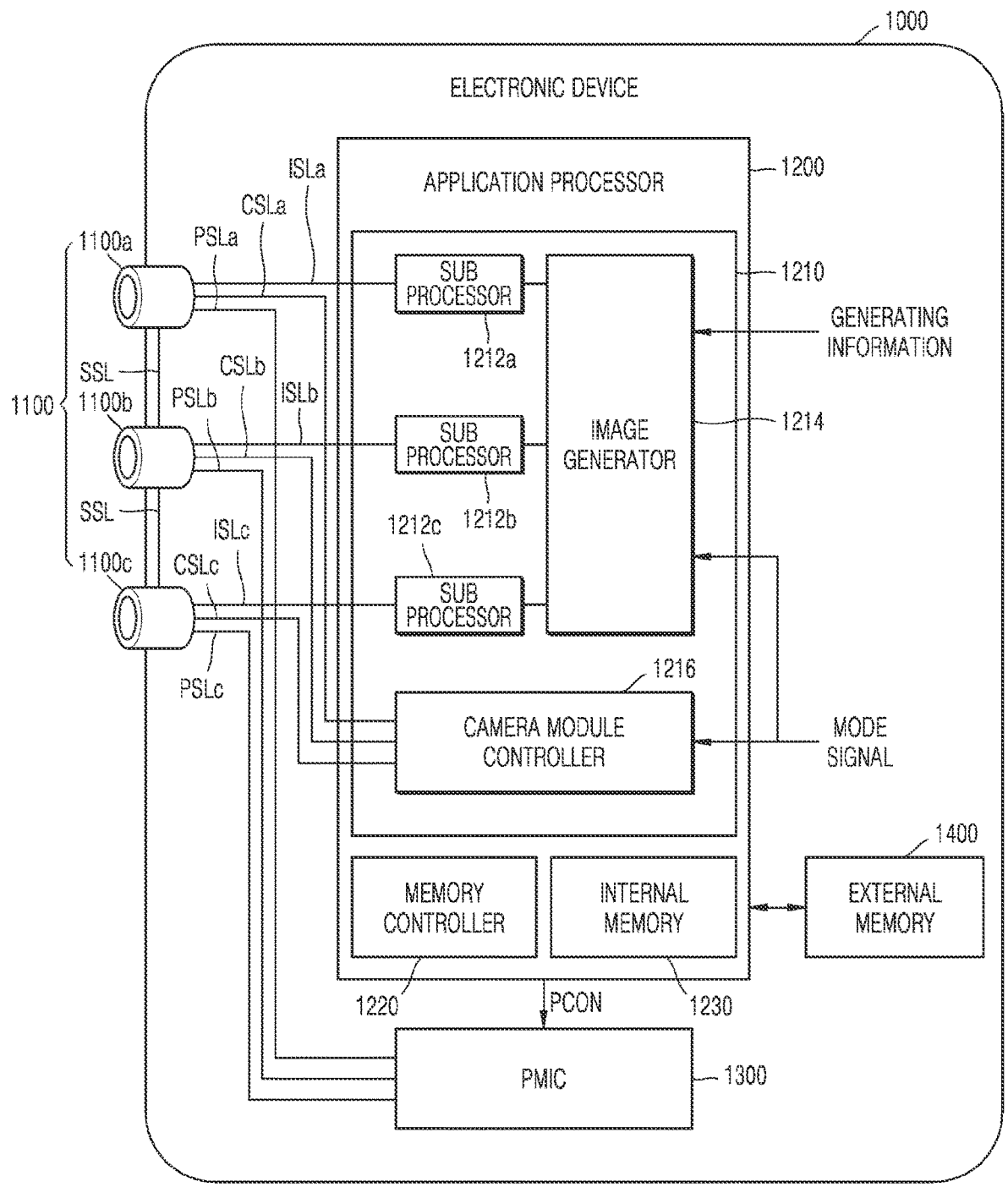
FIG. 13 is a block diagram of an electronic device including a multi-camera module to which an image sensor according to an embodiment is applied.
Figure 14:
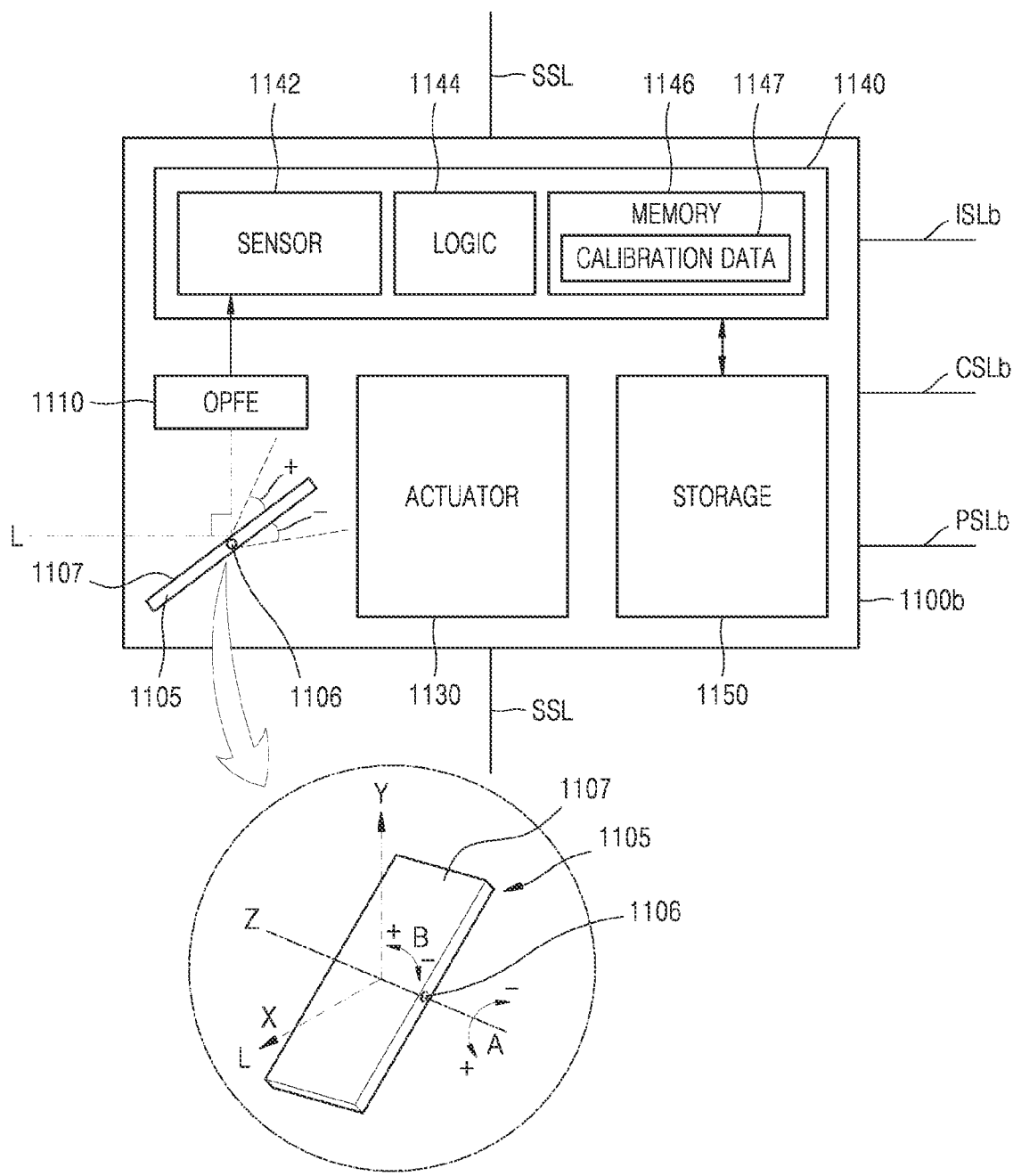
FIG. 14 is a detailed block diagram of the multi-camera module of FIG. 13 according to an embodiment.

FIG. 13 is a block diagram of an electronic device 1000 including a multi-camera module to which an image sensor according to an embodiment is applied. FIG. 14 is a detailed block diagram of the multi-camera module of FIG. 13 according to an embodiment.

Referring to FIG. 13, the electronic device 1000 may include a camera module group 1100, an application processor 1200, a power management integrated circuit (PMIC) 1300, and an external memory 1400.

The camera module group 1100 may include a plurality of camera modules 1100a to 1100c. Although an embodiment in which three camera modules 1100a to 1100c are provided is illustrated, the inventive concept is not limited thereto. For example, in some embodiments, the camera module group 1100 may include only two camera modules, or the camera module group 1100 may include n camera modules, where n is a natural number equal to 4 or more.

Hereinafter, a detailed configuration of the camera module 1100b will be described in more detail with reference to FIG. 14. According to embodiments, the following description may be identically applied to the other camera modules 1100a and 1100b.

Referring to FIG. 14, the camera module 1100b may include a prism 1105, an optical path folding element (OPFE) 1110, an actuator 1130, an image sensing device 1140, and a storage 1150.

The prism 1105 may include a reflective surface 1107 of a light reflecting material and may change a path of light L incident from outside of the image sensor.

In some embodiments, the prism 1105 may change the path of the light L, which is incident in a first direction X, to a second direction Y vertical to the first direction X. Also, the prism 1105 may rotate the reflective surface 1107 of the light reflecting material in an A direction with respect to a center axis 1106, or may rotate the center axis 1106 in a B direction to change the path of the light L, which is incident in the first direction X, to the second direction Y. The OPFE 1110 may move in a third direction Z vertical to the first direction X and the second direction Y.

In some embodiments, as illustrated, a maximum rotation angle of the prism 1105 in the A direction may be less than or equal to about 15 degrees in a positive (+) A direction and may be greater than about 15 degrees in a negative (−) A direction, but the inventive concept is not limited thereto.

In some embodiments, the prism 1105 may move within a range of about 20 degrees, or a range of about 10 degrees to about 20 degrees, or a range of about 15 degrees to about 20 degrees in a positive (+) or negative (−) B direction, and in a moving angle of the prism 1105, the prism 1105 may move at the same angle in the positive (+) or negative (−) B direction or may move at a substantially similar angle within a range of about 1 degree.

In some embodiments, the prism 1105 may move the reflective surface 1107 of the light reflecting material in the third direction (e.g., a Z direction) parallel to an extension direction of the center axis 1106.

The OPFE 1110 may include, for example, m (where m is a natural number) number of groups each including a plurality of optical lenses. Also, m number of lenses may move in the second direction Y to change an optical zoom ratio of the camera module 1100b. For example, in a case where a basic optical zoom ratio of the camera module 1100b is Z, when m number of optical lenses included in the OPFE 1110 move, the optical zoom ratio of the camera module 1100b may be changed to an optical zoom ration of 3Z or 5Z or more.

The actuator 1130 may move the OPFE 1110 or the optical lens to a certain position. For example, the actuator 1130 may adjust a position of the optical lens so that an image sensor 1142 is placed at a focal length of the optical lens for accurate sensing.

The image sensing device 1140 may include the image sensor 1142, a control logic 1144, and a memory 1146. The image sensor 1142 may sense an image of a sensing target by using the light L provided through the optical lens.

The control logic 1144 may control an overall operation of the camera module 1100b. For example, the control logic 1144 may control an operation of the camera module 1100b based on a control signal provided through a control signal line CSLb.

The memory 1146 may store information utilized for an operation of the camera module 1100b such as, for example, calibration data 1147. The calibration data 1147 may include information which is utilized for generating image data from the light L provided from outside of the image sensor by using the camera module 1100b. The calibration data 1147 may include, for example, information about the degree of rotation, information about a focal length, and information about an optical axis. In a case where the camera module 1100b is implemented in a multi-state camera form where a focal length varies based on a position of the optical lens, the calibration data 1147 may include a position-based (or state-based) focal length of the optical lens and information associated with auto focusing.

The storage 1150 may store image data sensed through the image sensor 1142. The storage 1150 may be disposed outside the image sensing device 1140 and may be implemented in a stacked form in which a sensor chip configuring the image sensing device 1140 and the storage 1150 are stacked. In some embodiments, the storage 1150 may be implemented with electrically erasable programmable read-only memory (EEPROM), but the inventive concept is not limited thereto.

Still referring to FIGS. 13 and 14, in some embodiments, each of the plurality of camera modules 1100a to 1100c may include the actuator 1130. Therefore, each of the plurality of camera modules 1100a to 1100c may include the same or different pieces of calibration data 1147 based on an operation of the actuator 1130 included therein.

In some embodiments, one camera module (e.g., 1100b) of the plurality of camera modules 1100a to 1100c may include a folded-lens camera module including the prism 1105 and the OPFE 1110 described above, and the other camera modules (e.g., 1100a and 1100b) may include a vertical camera module which does not include the prism 1105 and the OPFE 1110. However, the inventive concept is not limited thereto.

In some embodiments, one camera module (e.g., 1100c) of the plurality of camera modules 1100a to 1100c may include a vertical depth camera which extracts depth information by using, for example, an infrared (IR) ray. In this case, the application processor 1200 may merge image data, provided from the depth camera, with image data provided from another camera module (e.g., 1100a or 1100b) to generate a three-dimensional (3D) depth image.

In some embodiments, at least two camera modules (e.g., 1100a and 1100b) of the plurality of camera modules 1100a to 1100c may have different fields of view. In this case, for example, optical lenses of at least two camera modules (e.g., 1100a and 1100b) of the plurality of camera modules 1100a to 1100c may differ. However, the inventive concept is not limited thereto.

Also, in some embodiments, fields of view of the plurality of camera modules 1100a to 1100c may differ. In this case, optical lenses respectively included in the plurality of camera modules 1100a to 1100c may differ. However, the inventive concept is not limited thereto.

In some embodiments, the plurality of camera modules 1100a to 1100c may be disposed physically apart from one another. That is, in some embodiments, the plurality of camera modules 1100a to 1100c do not share a sensing region of one image sensor 1142, but rather, an independent image sensor 1142 may be disposed in each of the plurality of camera modules 1100a to 1100c.

Referring again to FIG. 13, the application processor 1200 may include an image processing device 1210, a memory controller 1220, and an internal memory 1230. The application processor 1200 may be implemented apart from the plurality of camera modules 1100a to 1100c. For example, the application processor 1200 and the plurality of camera modules 1100a to 1100c may be implemented as separate semiconductor chips.

The image processing device 1210 may include a plurality of sub image processors 1212a to 1212c, an image generator 1214, and a camera module controller 1216.

The image processing device 1210 may include the plurality of sub image processors 1212a to 1212c corresponding to the number of camera modules 1100a to 1100c.

Image data generated from each of the camera modules 1100a to 1100c may be provided to a corresponding sub image processor of the sub image processors 1212a to 1212c through a plurality of image signal lines ISLa, ISLb, and ISLc, which are spaced apart from one another. For example, image data generated from the camera module 1100a may be provided to the sub image processor 1212a through the image signal line ISLa, image data generated from the camera module 1100b may be provided to the sub image processor 1212b through the image signal line ISLb, and image data generated from the camera module 1100c may be provided to the sub image processor 1212c through the image signal line ISLc. The transfer of image data may be performed by using a camera serial interface (CSI) based on, for example, mobile industry processor interface (MIPI), but the inventive concept is not limited thereto.

In some embodiments, one sub image processor may be disposed to correspond to a plurality of camera modules. For example, the sub image processor 1212a and the sub image processor 1212c may not be separately implemented as illustrated, but rather, may be integrated and implemented as one sub image processor, and image data provided from the camera module 1100a and the camera module 1100c may be selected through a selection device (e.g., a multiplexer) and may be provided to an integrated sub image processor.

Image data provided to each of the sub image processors 1212a to 1212c may be provided to the image generator 1214. The image generator 1214 may generate an output image by using image data provided from the sub image processors 1212a to 1212c based on image generating information or a mode signal MD.

For example, the image generator 1214 may merge at least some of pieces of image data generated from the camera modules 1100a to 1100c having different fields of view based on the image generating information or the mode signal MD to generate an output image. Also, the image generator 1214 may select one piece of image data from among the pieces of image data generated from the camera modules 1100a to 1100c having different fields of view based on the image generating information or the mode signal MD to generate the output image.

Referring again to FIG. 4, according to an embodiment, the image generator 1214 may summate (digitally summate) pieces of image data generated by converting sensing signals respectively output from a plurality of subpixels. For example, a nano-cell which is a set of nine subpixels is illustrated in FIG. 4, and the image generator 1214, may receive image data which is a result obtained by individually performing analog-to-digital conversion on a plurality of subpixels included in each color channel, and may summate pieces of image data corresponding to a number of (e.g., eight) sensing pixels among a plurality of subpixels subsequently.

In some embodiments, the image generating information may include a zoom signal or zoom factor. Also, in some embodiments, the mode signal MD may be, for example, a signal based on a mode selected by a user.

When the image generating information is a zoom signal (a zoom factor) and the camera modules 1100a to 1100c have different fields of view, the image generator 1214 may perform different operations based on the kind of zoom signal. For example, when the zoom signal is a first signal, image data output from the camera module 1100a may be merged with image data output from the camera module 1100b, and then, an output image may be generated by using a merged image signal and the image data which is not used for the merging and is output from the camera module 1100b. For example, in an embodiment, when the zoom signal is a second signal which differs from the first signal, the image generator 1214 does not perform the merging of the image data and may select one piece of image data from among the pieces of image data respectively output from the camera modules 1100a to 1100c to generate the output image. However, the inventive concept is not limited thereto, and depending on the case, an image data processing method may be modified.

In some embodiments, the image generator 1214 may receive pieces of image data having different exposure times from at least one of the plurality of sub image processors 1212a to 1212c, and may perform high dynamic range (HDR) processing on the pieces of image data to generate merged image data where a dynamic range has increased.

The camera module controller 1216 may provide a control signal to each of the camera modules 1100a to 1100c. A control signal generated from the camera module controller 1216 may be provided to a corresponding camera module of the camera modules 1100a to 1100c through the control signal lines CSLa, CSLb, and CSLc, which are spaced apart from one another.

One of the plurality of camera modules 1100a to 1100c may be designated as a master camera (e.g., 1100b) based on the mode signal MD or the image generating information including the zoom signal, and the other camera module (e.g., 1100a and 1100c) may be designated as a slave camera. Such information may be included in the control signal and may be provided to a corresponding camera module of the camera modules 1100a to 1100c through the control signal lines CSLa, CSLb, and CSLc.

A camera module operating as a master or a slave may be changed based on a zoom factor or an operation mode signal. For example, when a field of view of the camera module 1100a is wider than a field of view of the camera module 1100b and the zoom factor represents a low zoom ratio, the camera module 1100b may operate as a master, and the camera module 1100a may operate as a slave. Alternatively, when the zoom factor represents a high zoom ratio, the camera module 1100a may operate as a master, and the camera module 1100b may operate as a slave.

In some embodiments, the control signal provided from the camera module controller 1216 to each of the camera modules 1100a to 1100c may include a sync enable signal. For example, when the camera module 1100b is a master camera and each of the camera modules 1100a and 1100c is a slave camera, the camera module controller 1216 may transfer the sync enable signal to the camera module 1100b. The camera module 1100b provided with the sync enable signal may generate a sync signal based on the sync enable signal and may provide the generated sync signal to the camera modules 1100a and 1100b through a sync signal line SSL. The camera module 1100b and the camera modules 1100a and 1100c may be synchronized with the sync signal and may transfer image data to the application processor 1200.

In some embodiments, the control signal provided from the camera module controller 1216 to the camera modules 1100a to 1100c may include mode information based on the mode signal MD. Based on the mode information, the plurality of camera modules 1100a to 1100c may operate in a first operation mode and a second operation mode in association with a sensing speed.

In the first operation mode, the plurality of camera modules 1100a to 1100c may generate an image signal at a first speed, for example, generate an image signal having a first frame rate, encode the image signal at a second speed which is higher than the first speed, for example, encode the image signal having a second frame rate which is higher than the first frame rate, and transfer the encoded image signal to the application processor 1200. In this case, the second speed may be about 30 or less times the first speed.

The application processor 1200 may store the received image signal (e.g., the encoded image signal) in the memory 1230 included therein or the external memory 1400 disposed outside of the application processor 1200, and then, may read and decode the encoded image signal from the memory 1230 or the external memory 1400 and may display image data generated based on the decoded image signal. For example, a corresponding sub image processor of the plurality of sub image processors 1212a to 1212c of the image processing device 1210 may perform decoding and may perform image processing on the decoded image signal.

In the second operation mode, the plurality of camera modules 1100a to 1100c may generate an image signal at a third speed which is lower than the first speed, for example, generate an image signal having a third frame rate which is lower than the first frame rate, and may transfer the generated image signal to the application processor 1200. The image signal provided to the application processor 1200 may be a signal on which encoding is not performed. The application processor 1200 may perform image processing on the image signal received thereby, or may store an image signal in the memory 1230 or the external memory 1400.

The PMIC 1300 may supply power (e.g., a source voltage) to each of the plurality of camera modules 1100a to 1100c. For example, under the control of the application processor 1200, the PMIC 1300 may supply first power to the camera module 1100a through a power signal line PSLa, supply second power to the camera module 1100b through a power signal line PSLb, and supply third power to the camera module 1100c through a power signal line PSLc.

In response to a power control signal PCON received from the application processor 1200, the PMIC 1300 may generate power corresponding to each of the plurality of camera modules 1100a to 1100c and may adjust a level of the power. The power control signal PCON may include a power adjustment signal based on an operation mode of each of the plurality of camera modules 1100a to 1100c. For example, the operation mode may include a low power mode, and in this case, the power control signal PCON may include information about a predetermined power level and a camera module which operates in the low power mode. Levels of powers respectively supplied to the plurality of camera modules 1100a to 1100c may be the same or may differ. Also, a level of a power may dynamically vary.

Figure 15:
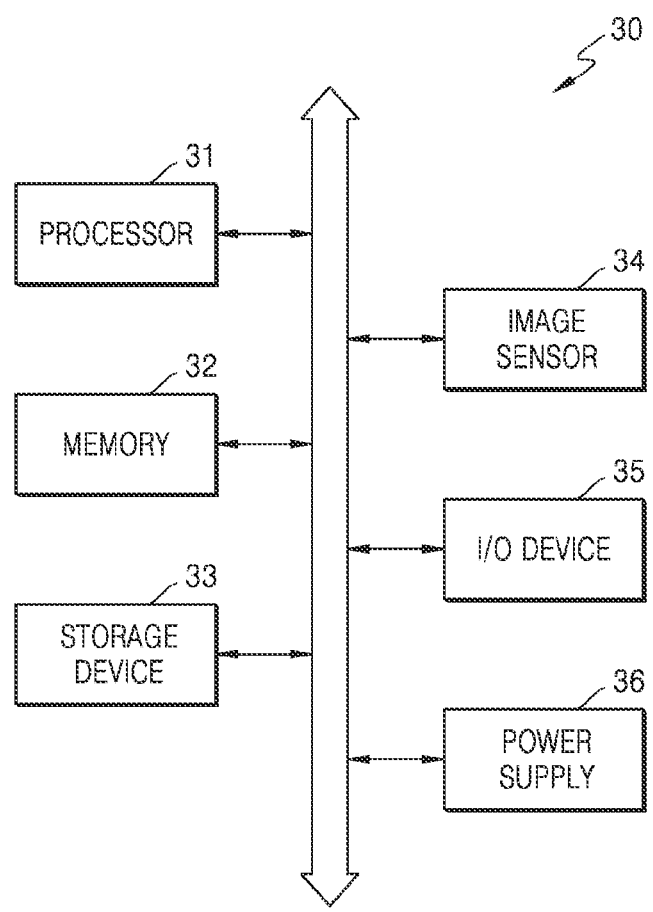
FIG. 15 is a block diagram illustrating an electronic device according to an embodiment.

FIG. 15 is a block diagram illustrating an electronic device 30 according to an embodiment.

Referring to FIG. 15, the electronic device 30 may include a processor 31, a memory 32, a storage device 33, an image sensor 34, an input/output (I/O) device 35, and a power supply 36, and the elements may communicate with one another through a bus. The image sensor 100 of FIG. 10 may be applied as the image sensor 34 of FIG. 15, and for convenience of explanation, repeated descriptions are omitted.

The processor 31 may perform calculations or tasks utilized for an operation of the electronic device 30. The memory 32 and the storage device 33 may store data utilized for the operation of the electronic device 30. For example, the processor 31 may include a microprocessor, a CPU, or an application processor, the memory 32 may include a volatile memory or a non-volatile memory, and the storage device 33 may include a solid state drive (SSD), a hard disk drive (HHD), or a CD-ROM.

The I/O device 35 may include an input means such as, for example, a keyboard, a keypad, or a mouse, and an output means such as, for example, a printer or a display. The power supply 36 may supply an operating voltage utilized for operation of the electronic device 30.

FIG. 16 is a block diagram illustrating an electronic device 1a according to an embodiment.

Referring to FIG. 16, the electronic device 1a according to an embodiment may include an image sensor 10a, an image signal processor (ISP) 20a, an application processor (AP) 30a, a display device 50a, a working memory 40a, a storage device 60a, a user interface 70a, and a wireless transceiver 80a. The image sensor 100 of FIG. 1 may operate as the image sensor 10a of FIG. 17, and for convenience of explanation, repeated descriptions are omitted.

The image sensor 10a may generate image data, for example, raw image data, based on a light signal received thereby, and may provide binary data to the image signal processor 20a. For example, the readout circuit (e.g., 150 of FIG. 1) may convert a sensing signal, received from the pixel array (e.g., 110b of FIG. 1) through a plurality of column lines CL, into binary data. The image signal processor 20a may perform image processing, for example, may convert image data IDAT of a Bayer pattern into a YUV or RGB format, for converting a data format of the image data IDAT which is digital data of an image, and for example, may remove noise, adjust brightness, and adjust sharpness, so as to increase image quality. In an embodiment, the image signal processor 20a may perform, for example, white balancing, denoising, demosaicking, lens shading, gamma correction, edge detection, edge enhancement, noise reduction processing, gain adjustment, waveform standardization processing, interpolation processing, edge emphasis processing, and binning to remove distortion of the image data IDAT, and may perform a preprocessing operation for increasing algorithm performance. As the image signal processor 20a performs preprocessing, a post-processing speed of the image data IDAT may be increased. The image sensor 10a and the image signal processor 20a may be referred to as a camera module 15a.

In an embodiment, the image signal processor 20a may be provided outside the image sensor 10a so as to increase space efficiency, or may be included in the image sensor 10a so as to increase a processing speed. In an embodiment, for convenience of description, it is described that the image signal processor 20a and the application processor 30a are separately provided, but the inventive concept is not limited thereto. For example, according to embodiments, the image signal processor 20a is not configured with separate hardware, or a combination of hardware and software and may be provided as a lower element of the application processor 30a.

The application processor 30a may control an overall operation of the electronic device 1a and may be provided as a system on chip (SoC) which drives an application program and an operating system (OS). The application processor 30a may control an operation of the image signal processor 20a and may provide the display device 50a with converted image data generated by the image signal processor 20a, or may store the converted image data in the storage device 60a.

The working memory 40a may store programs, executed by the application processor 30a, and/or data obtained through processing by the application processor 30a. The storage device 60a may be implemented as a non-volatile memory device such as, for example, NAND flash memory or a resistive memory. The storage device 60a may be provided as, for example, a memory card such as, for example, a multimedia card (MMC), an embedded multimedia card (eMMC), a secure digital (SD) card, or a micro-SD card.

The storage device 60a may store data and/or a program corresponding to an execution algorithm which controls an image processing operation of the image signal processor 20a, and when the image processing operation is performed, the data and/or the program may be loaded into the working memory 40a. For example, the working memory 40a or the storage device 60a may be a non-volatile memory and may include, for example, read only memory (ROM), flash memory, phase change random access memory (RAM) (PRAM), magnetic RAM (MRAM), resistive RAM (RRAM), or ferroelectric RAM (FRAM), or may be a volatile memory and may include, for example, static RAM (SRAM) or dynamic RAM (DRAM). However, the inventive concept is not limited thereto.

The user interface 70a may be implemented with various devices that receive a user input such as, for example, a keyboard, a key panel, a touch panel, a fingerprint sensor, or a microphone. The user interface 70a may receive the user input and may provide the application processor 30a with a signal corresponding to the received user input. The wireless transceiver 80a may include a modem 81a, a transceiver 82a, and an antenna 83a.

As the demand for high-quality images increases, pixels of image sensors may be highly integrated. When a pixel size of each image sensor decreases and a pattern of the pixel array is uneven, an increase in crosstalk between pixels may occur. Referring to a comparative example, a target pixel may be adversely affected by a signal occurring in an adjacent pixel due to such crosstalk, and thus, a spectroscopic characteristic of a signal generated by the target pixel may be changed, causing a reduction in color reproducibility. Due to the occurrence of crosstalk, the quality of an image may be degraded. Embodiments of the inventive concept remove or reduce this adverse effect of crosstalk, as described above.

As is traditional in the field of the inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the inventive concept has been particularly shown and described with reference to embodiments thereof, it will be understood that various changes in form and detail may be made therein without departing from the spirit and scope of the inventive concept as defined by the following claims.

What is claimed is:

1. A pixel array comprising a plurality of pixel groups, each of the plurality of pixel groups comprising:
   a plurality of subpixels arranged in an M×N matrix,
      wherein M is a natural number equal to or greater than 2, and N is a natural number equal to or greater than 2; and
   a plurality of color pixels configured to sense pieces of light having different wavelength bands,
      wherein each of the plurality of color pixels comprises a same number of phase detection pixels,
      wherein the plurality of color pixels comprises a first color pixel and a second color pixel, and
   a first phase detection pixel included in the first color pixel is disposed at a same position in the first color pixel, relative to subpixels in the first color pixel, as a second phase detection pixel included in the second color pixel, relative to subpixels in the second color pixel.

2. The pixel array of claim 1, wherein each of the phase detection pixels is disposed at a predetermined position of each of the plurality of color pixels.

3. The pixel array of claim 1, wherein the plurality of color pixels comprises a first color pixel and a second color pixel, and a first phase detection pixel included in the first color pixel is directly adjacent to a second phase detection pixel included in the second color pixel.

4. The pixel array of claim 3, wherein the first phase detection pixel and the second phase detection pixel share one micro-lens.

5. The pixel array of claim 1, wherein the plurality of pixel groups comprises a first pixel group comprising a first color pixel and a second pixel group comprising a second color pixel, and
a first phase detection pixel included in the first color pixel is directly adjacent to a second phase detection pixel included in the second color pixel.

6. The pixel array of claim 1, wherein the plurality of color pixels comprises a first color pixel comprising a first phase detection pixel and a second color pixel comprising a second phase detection pixel, and
a position of the first phase detection pixel is symmetrical with a position of the second phase detection pixel.

7. The pixel array of claim 1, wherein an amount of crosstalk occurring in each phase detection pixel from a directly adjacent subpixel is the same for each color pixel.

8. The pixel array of claim 1, wherein the plurality of color pixels comprises a first green pixel, a red pixel, a blue pixel, and a second green pixel.

9. The pixel array of claim 8, wherein the first green pixel comprises a first phase detection pixel,
the red pixel comprises a second phase detection pixel,
the blue pixel comprises a third phase detection pixel,
the second green pixel comprises a fourth phase detection pixel, and
the first to fourth phase detection pixels are directly adjacent to one another.

10. The pixel array of claim 9, wherein the first to fourth phase detection pixels share one micro-lens.

11. The pixel array of claim 1, wherein each of the phase detection pixels comprises a metal shield.

12. An image sensor, comprising:
a pixel array comprising a plurality of subpixels and a plurality of color pixels configured to sense pieces of light having different wavelength bands,
wherein each of the plurality of color pixels comprises a same number of phase detection pixels,
wherein the plurality of color pixels comprises a first color pixel and a second color pixel, and
a first phase detection pixel included in the first color pixel is disposed at a same position in the first color pixel, relative to subpixels in the first color pixel, as a second phase detection pixel included in the second color pixel, relative to subpixels in the second color pixel;
a readout circuit configured to convert a sensing signal, received from the pixel array through a plurality of column lines, into binary data;
a row decoder configured to generate a row selection signal controlling the pixel array such that the sensing signal is output through a plurality of row lines for each row; and
a control logic configured to control the row decoder and the readout circuit.

13. The image sensor of claim 12, wherein each of the plurality of color pixels comprises one phase detection pixel.

14. An image sensor, comprising:
a pixel array comprising a plurality of subpixels and a plurality of color pixels configured to sense pieces of light having different wavelength bands,
wherein each of the plurality of color pixels comprises a phase detection pixel disposed at a certain position,
wherein the plurality of color pixels comprises a first color pixel and a second color pixel, and
a first phase detection pixel included in the first color pixel is disposed at a same position in the first color pixel, relative to subpixels in the first color pixel, as a second phase detection pixel included in the second color pixel, relative to subpixels in the second color pixel;
a readout circuit configured to convert a sensing signal, received from the pixel array through a plurality of column lines, into binary data;
a row decoder configured to generate a row selection signal controlling the pixel array such that the sensing signal is output through a plurality of row lines for each row; and
a control logic configured to control the row decoder and the readout circuit and to change a method of outputting the sensing signal based on a mode signal.

15. The image sensor of claim 14, wherein the mode signal indicates a first mode or a second mode, and
the pixel array is configured to output the sensing signal from each of the plurality of subpixels based on the first mode and to summate and output sensing results of the plurality of subpixels based on the second mode.

* * * * *